United States Patent [19]

Smart

[11] Patent Number: 5,231,438
[45] Date of Patent: Jul. 27, 1993

[54] CAMERA WITH INTERLOCK FOR COVER PIECE AND CARTRIDGE LIGHT SHIELD

[75] Inventor: David C. Smart, Rochester, N.Y.
[73] Assignee: Eastman Kodak Company, Rochester, N.Y.
[21] Appl. No.: 797,759
[22] Filed: Nov. 25, 1991
[51] Int. Cl.⁵ .............................................. G03B 17/26
[52] U.S. Cl. ..................... 354/281; 354/288
[58] Field of Search .............. 354/21, 275, 277, 281, 354/288

[56] References Cited

U.S. PATENT DOCUMENTS

| | | | |
|---|---|---|---|
| 2,317,096 | 4/1943 | Dunn | 352/76 |
| 2,728,263 | 12/1955 | Schmitt et al. | 352/76 |
| 2,731,894 | 1/1956 | Leitz et al. | 354/275 |
| 4,135,802 | 1/1979 | Scharre et al. | 354/275 |
| 4,194,822 | 3/1980 | Sethi | 354/275 X |
| 4,221,479 | 9/1980 | Harvey | 354/275 |
| 4,630,912 | 12/1986 | Whiteside | 354/275 X |
| 4,714,335 | 12/1987 | Desormeaux | 354/288 X |
| 4,832,275 | 5/1989 | Robertson | 354/275 X |
| 4,938,429 | 7/1990 | Robertson et al. | 242/71.1 |
| 4,962,401 | 10/1990 | Takahashi | 354/275 |
| 4,984,016 | 1/1991 | Makino et al. | 354/277 X |
| 5,031,852 | 7/1991 | Dowling et al. | 354/275 X |
| 5,032,861 | 7/1991 | Pagano | 354/275 |
| 5,049,913 | 9/1991 | Pagano et al. | 354/275 |

FOREIGN PATENT DOCUMENTS 2-27133  3/1990  Japan .

Primary Examiner—Michael L. Gellner
Assistant Examiner—J. K. Han
Attorney, Agent, or Firm—Roger A. Fields

[57] ABSTRACT

In a camera to be used with a self-opening cassette, an interlock for a cover piece of the camera and a light valve of the cassette prevents the cover piece from being opened when the light valve cannot be closed because a filmstrip is protruding out of the cassette.

5 Claims, 26 Drawing Sheets

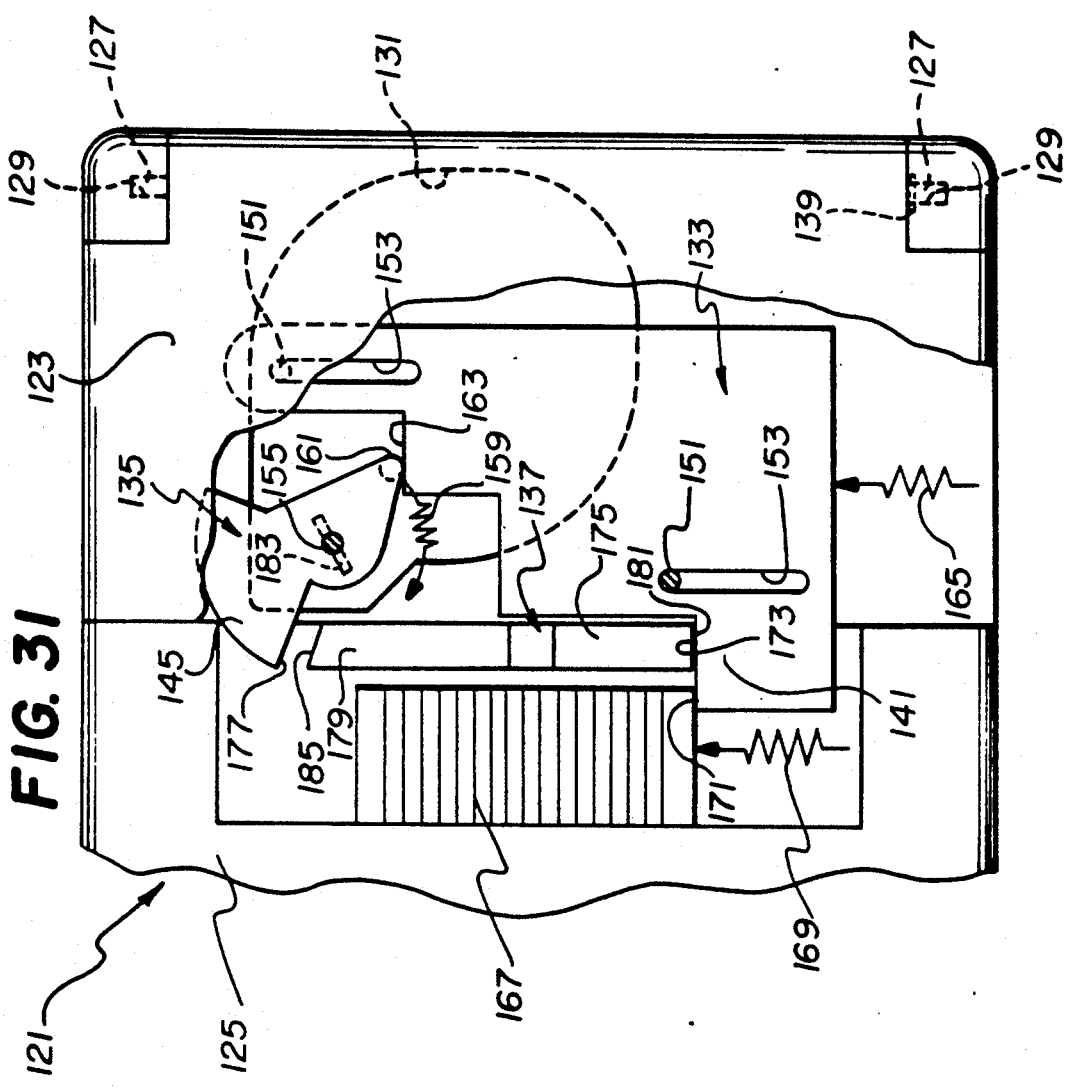
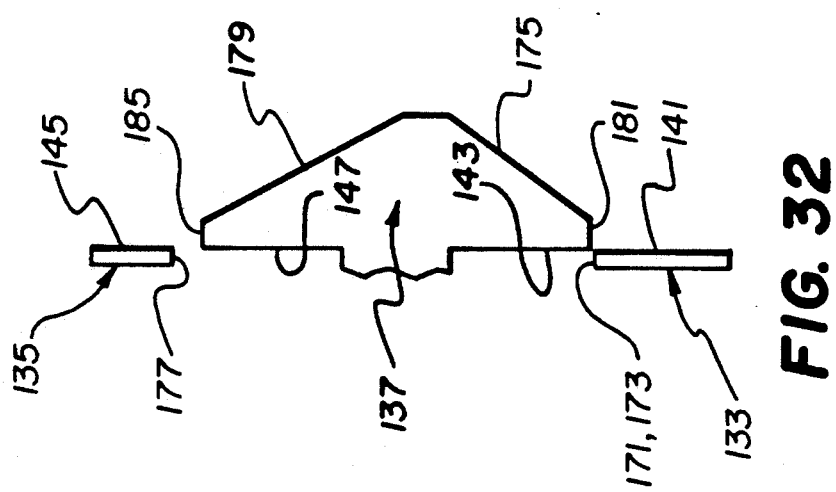

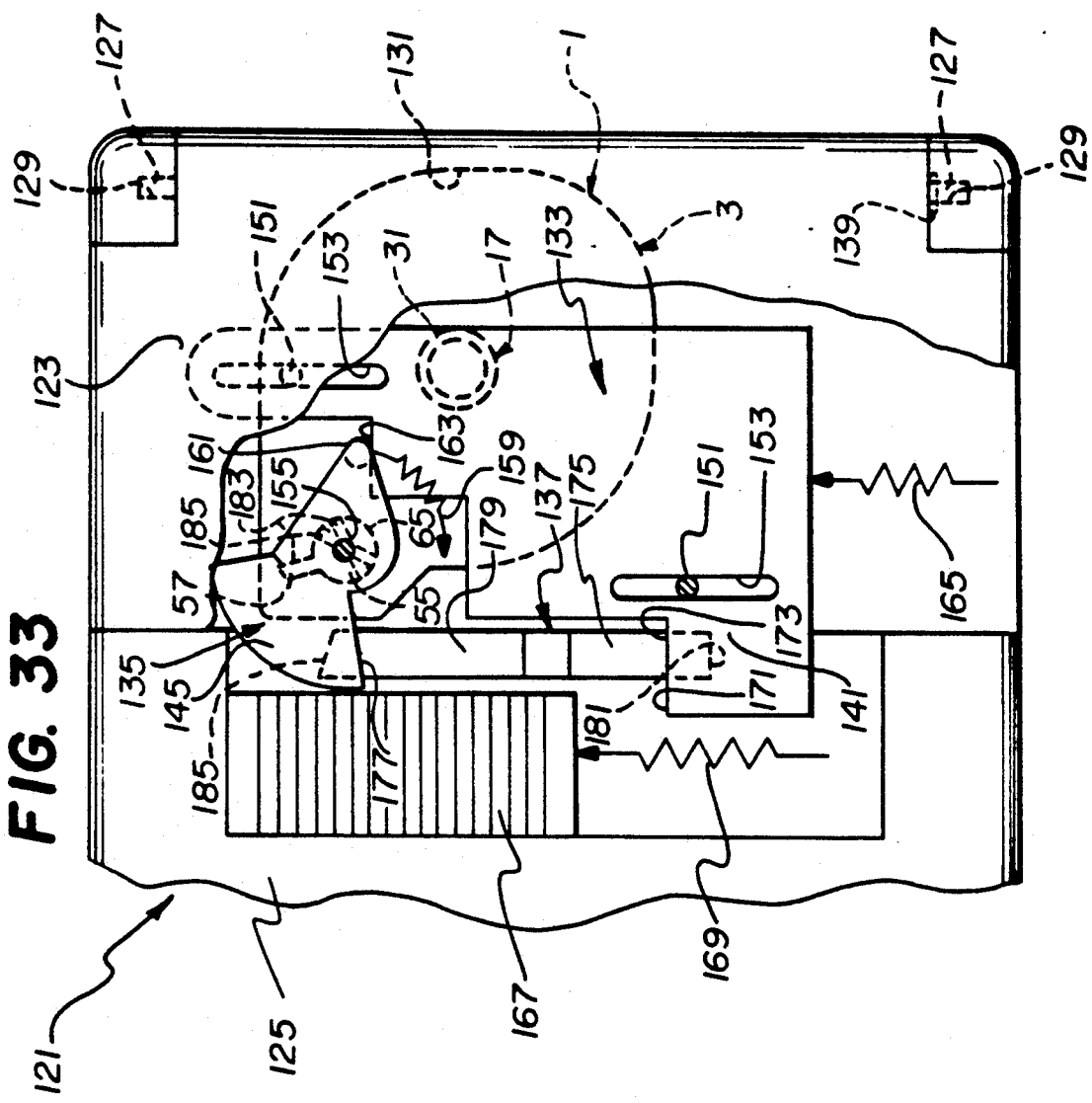

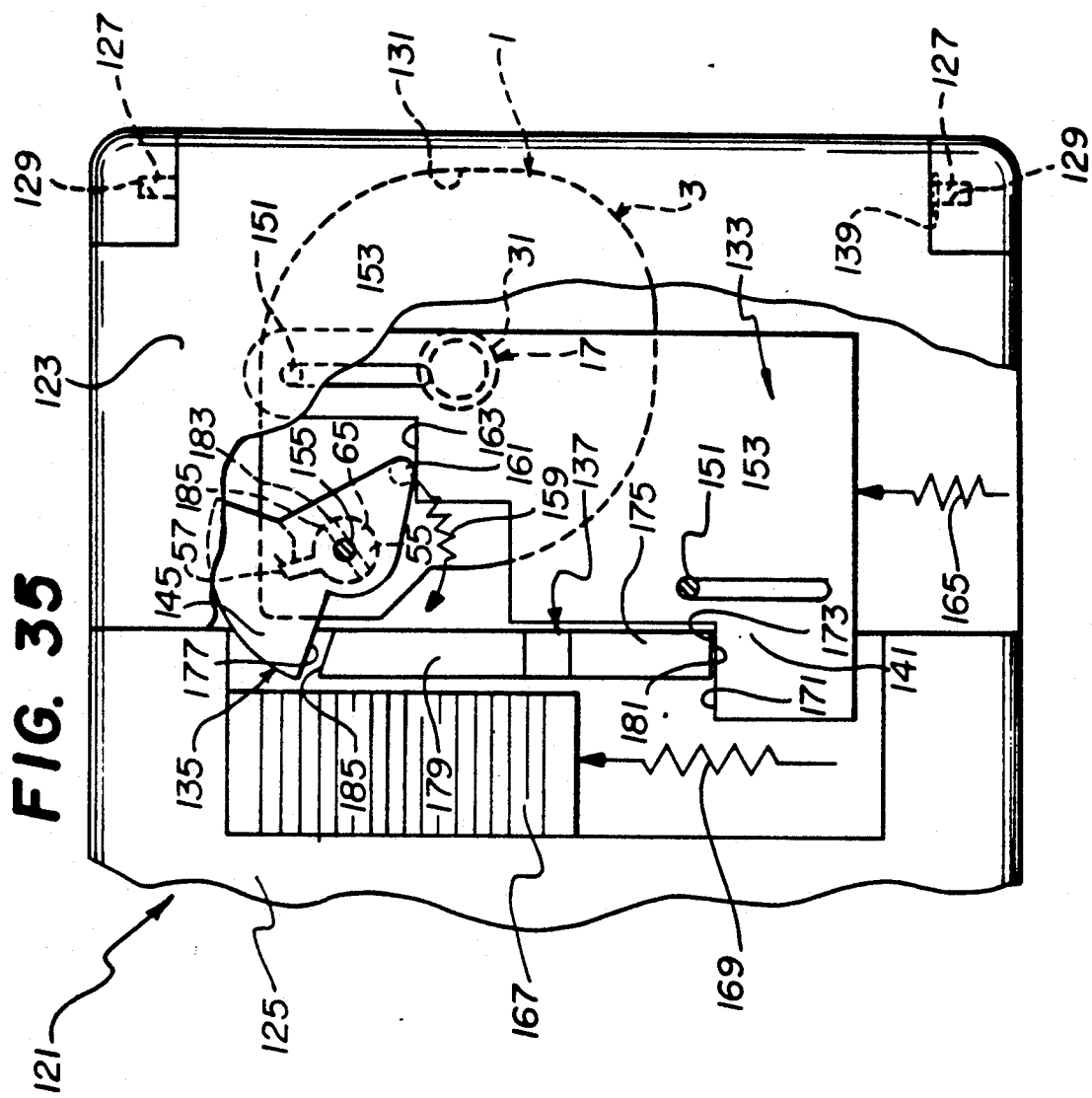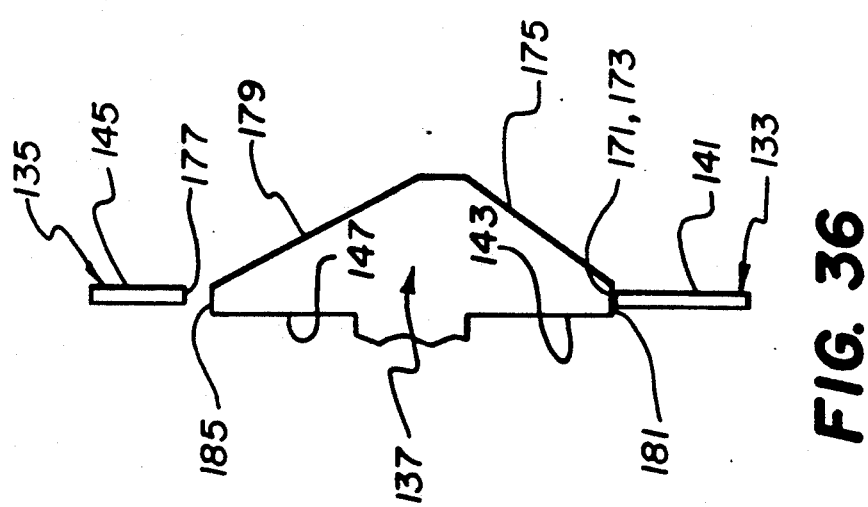

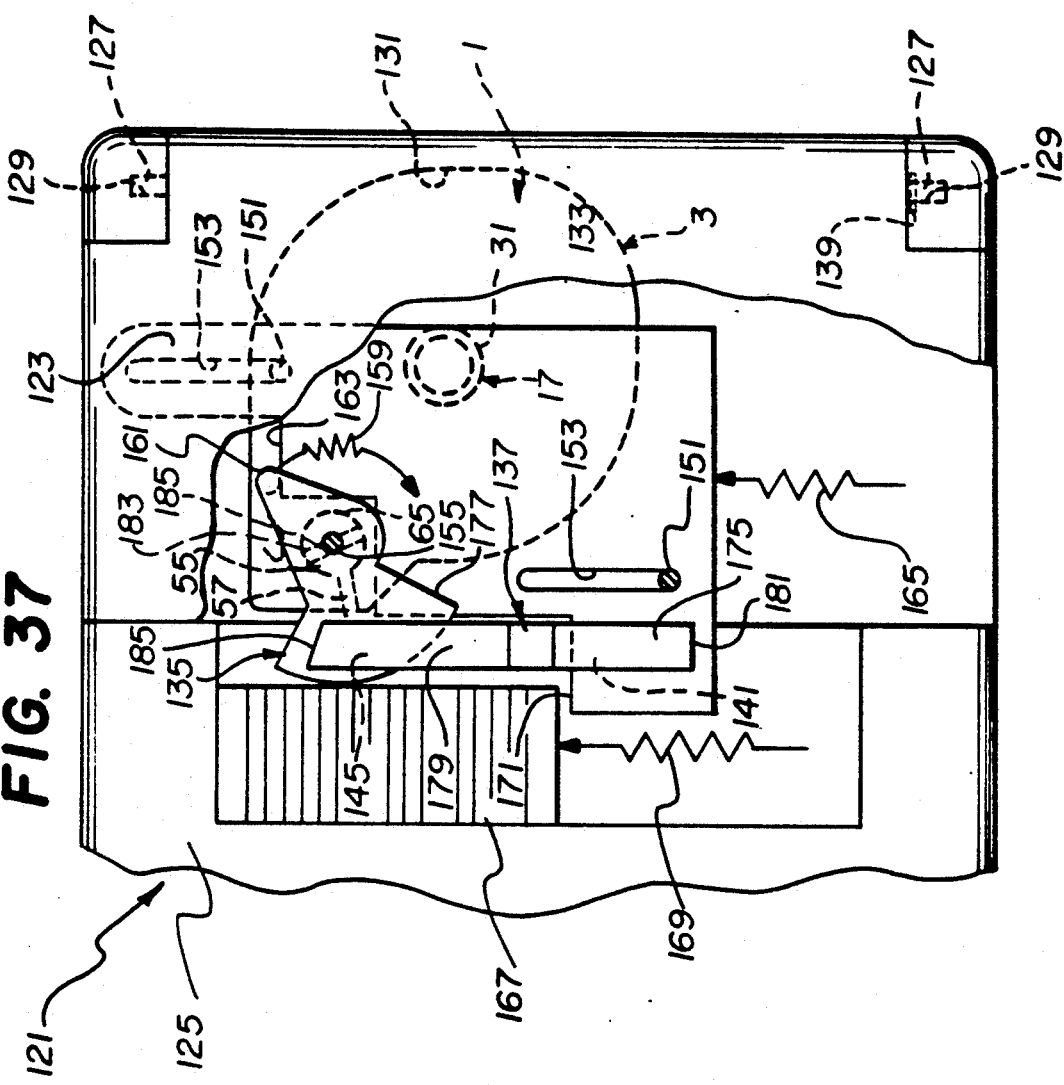

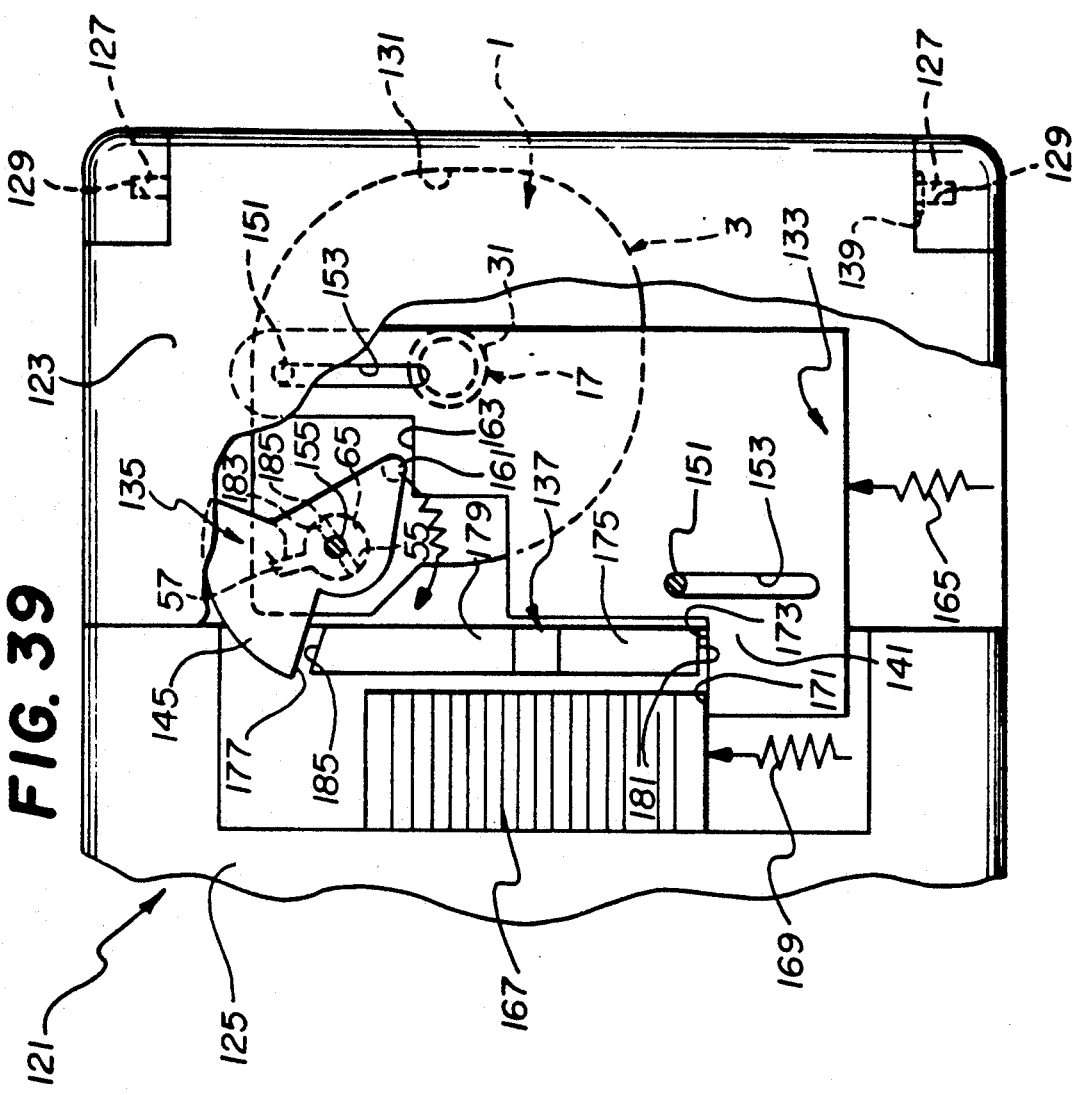

CAMERA WITH INTERLOCK FOR COVER PIECE AND CARTRIDGE LIGHT SHIELD

CROSS-REFERENCE TO RELATED APPLICATIONS

Reference is made to commonly assigned copending applications Ser. No. 07/787,356, entitled FILM CASSETTE WITH INTEGRATED CASSETTE ELEMENT LOCK AND LIGHT BLOCKING DEVICE and filed Nov. 4, 1991 in the name of Dennis R. Zander, Ser. No. 07/787,802, entitled FILM CASSETTE WITH UNITARY FILM STRIPPER AND LIGHT BLOCKING DEVICE and filed Nov. 4, 1991 in the name of Dennis R. Zander, Ser. No. 07/787,803, entitled FILM CASSETTE WITH FLANGED FILM SPOOL and filed Nov. 4, 1991 in the names of Dennis R. Zander, and Serial No. 07/793,980, entitled FILM CASSETTE WITH SPOOL CORE HAVING FASTENING HOOK and filed Nov. 18, 1991 in the names of Dennis R. Zander and Douglas M. Csaszar.

Field of the Invention

The invention relates generally to the field of photography, and in particular to an interlock for a camera and a self-opening cassette.

Description of the Prior Art

Years ago there had been proposed a self-opening 35 mm cassette. The cassette was designed to dispense with the conventional plush light trap. Instead of the filmstrip being drawn outwardly through the plush light trap, it leaves the cassette through a wide opening to eliminate the possibility of film scratches. The body of the cassette consists of two cylindrical sleeves, one rotatable within the other. In each sleeve, there is a longitudinal film ingress/egress opening. A spool with the filmstrip coiled about it is rotatably supported inside the inner sleeve. Normally, the inner and outer sleeves are relatively positioned with their respective longitudinal openings significantly removed from each other to make the cassette light-tight. The sleeves are machined to permit a leading end portion of the filmstrip to protrude through the longitudinal openings and out of the cassette.

When the cassette is inserted into a camera, the cassette is opened by turning a cover locking key of the camera to rotate the inner sleeve until the two longitudinal openings coincide—hence the term "self-opening" that is often applied to the cassette. Turning the cover locking key to open the cassette locks a cover plate on the camera to prevent the camera from being opened while the cassette is open. A problem, however, is that the cover locking key can be turned to close the cassette and unlock the cover plate, to permit the camera to be opened, while a substantial length of the filmstrip is outside the cassette. Hence, the filmstrip would be ruined.

SUMMARY OF THE INVENTION

In a camera to be used with a self-opening cassette, an interlock for a cover piece of the camera and a light valve of the cassette prevents the cover piece from being opened when the light valve cannot be closed because a filmstrip is protruding out of the cassette.

BRIEF DESCRIPTION OF THE DRAWINGS

FIGS. 29 and 30, 31 and 32, 33 and 34, 35 and 36, 37 and 38, 39 and 40, 41 and 42, are respective plan and elevation views of the interlock, showing its various stages of operation.

DETAILED DESCRIPTION OF THE PREFERRED EMBODIMENT

The invention is disclosed as being embodied in a camera preferably to be used with a 35 mm film cassette. Because the features of this type of camera are generally known, the description which follows is directed in particular to elements forming part of or cooperating directly with the disclosed embodiment. It is to be understood, however, that other elements not specifically shown or described may take various forms known to persons of ordinary skill in the art.

The Film Cassette—General

Figure 1:
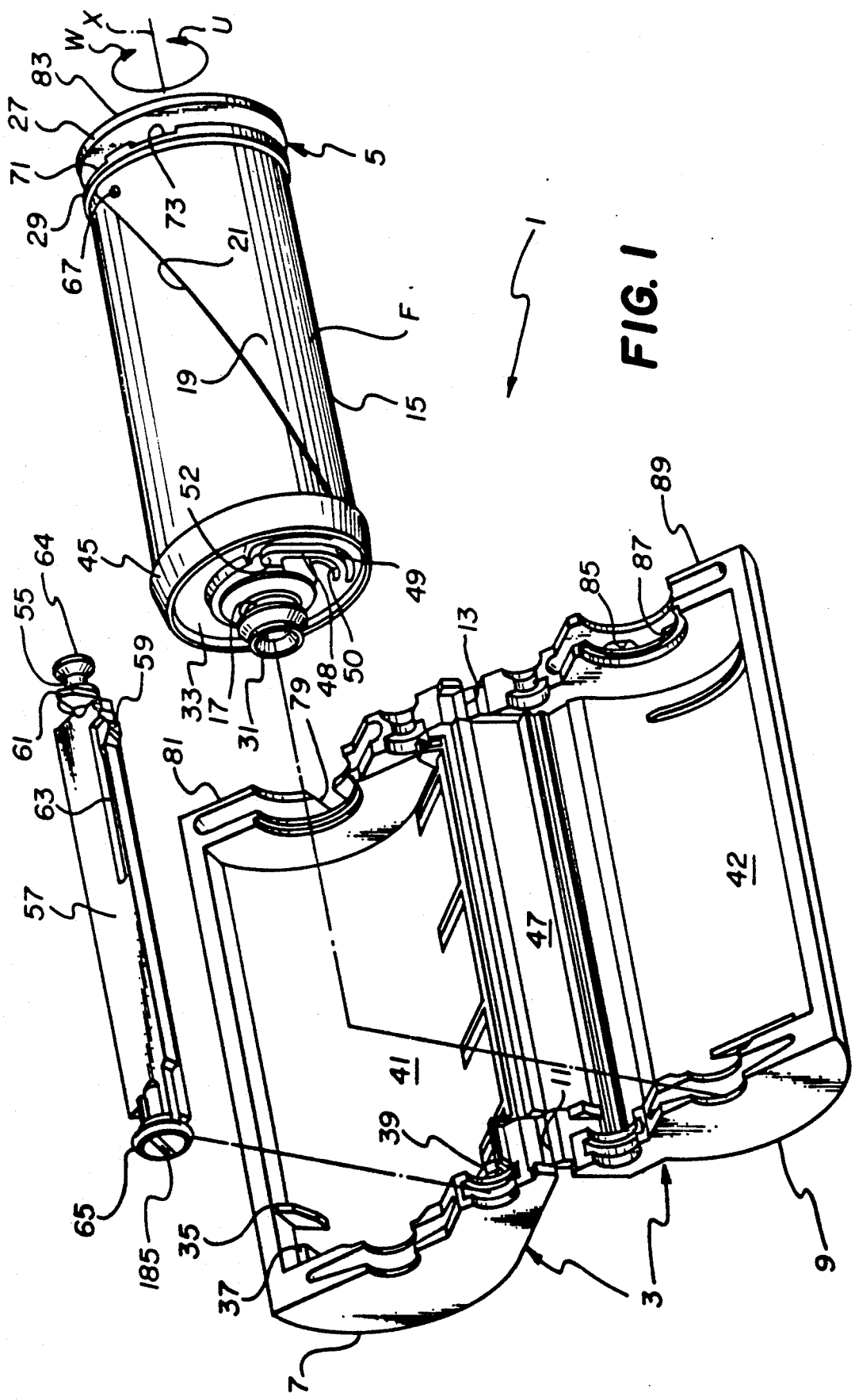
FIG. 1 is an exploded perspective view of a film cassette, showing two halves of the cassette shell opened and the various cassette components removed from the shell halves.
Figure 2:
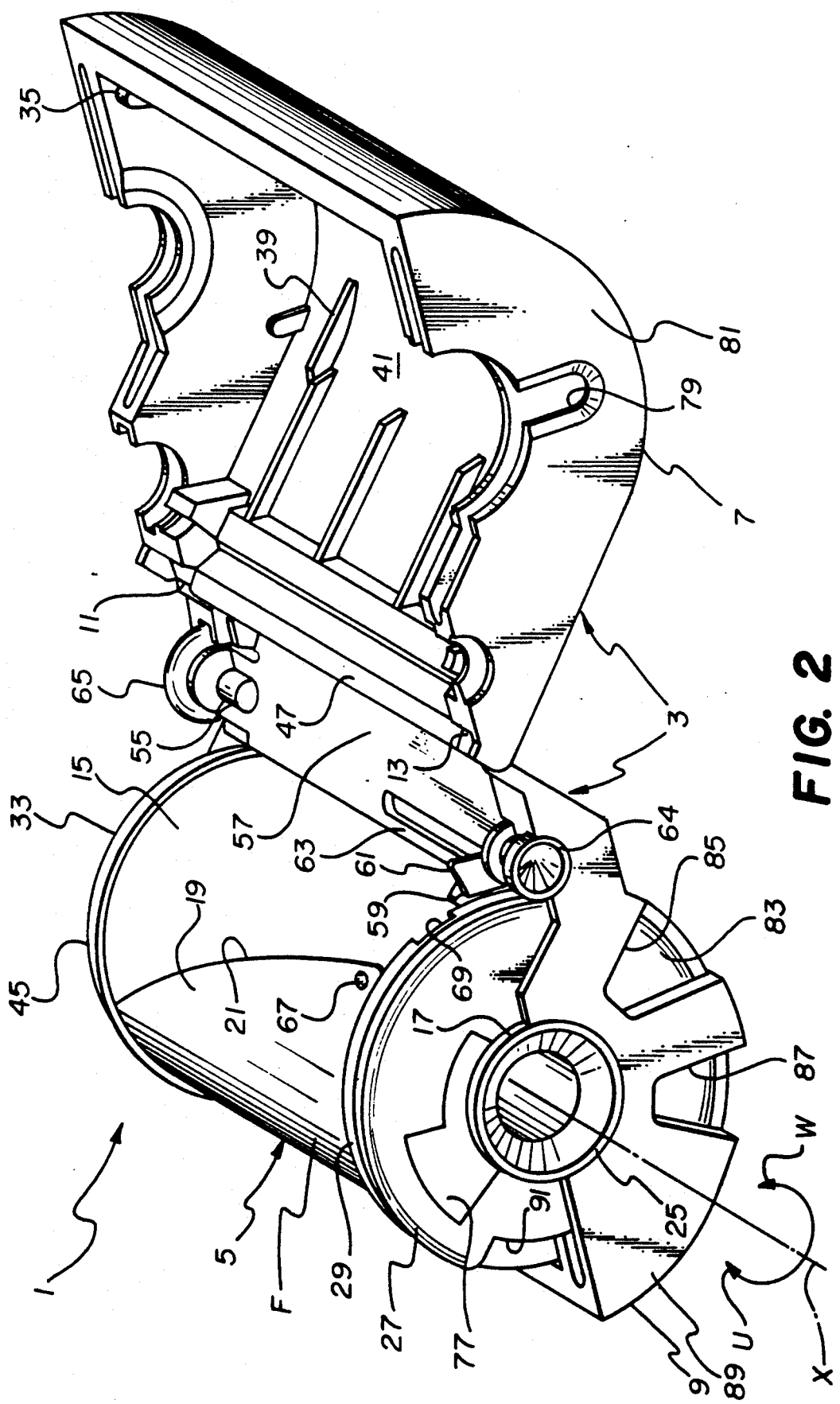
FIG. 2 is a perspective view of the film cassette, showing the two shelf halves opened with the various cassette components in place.
Figure 3:
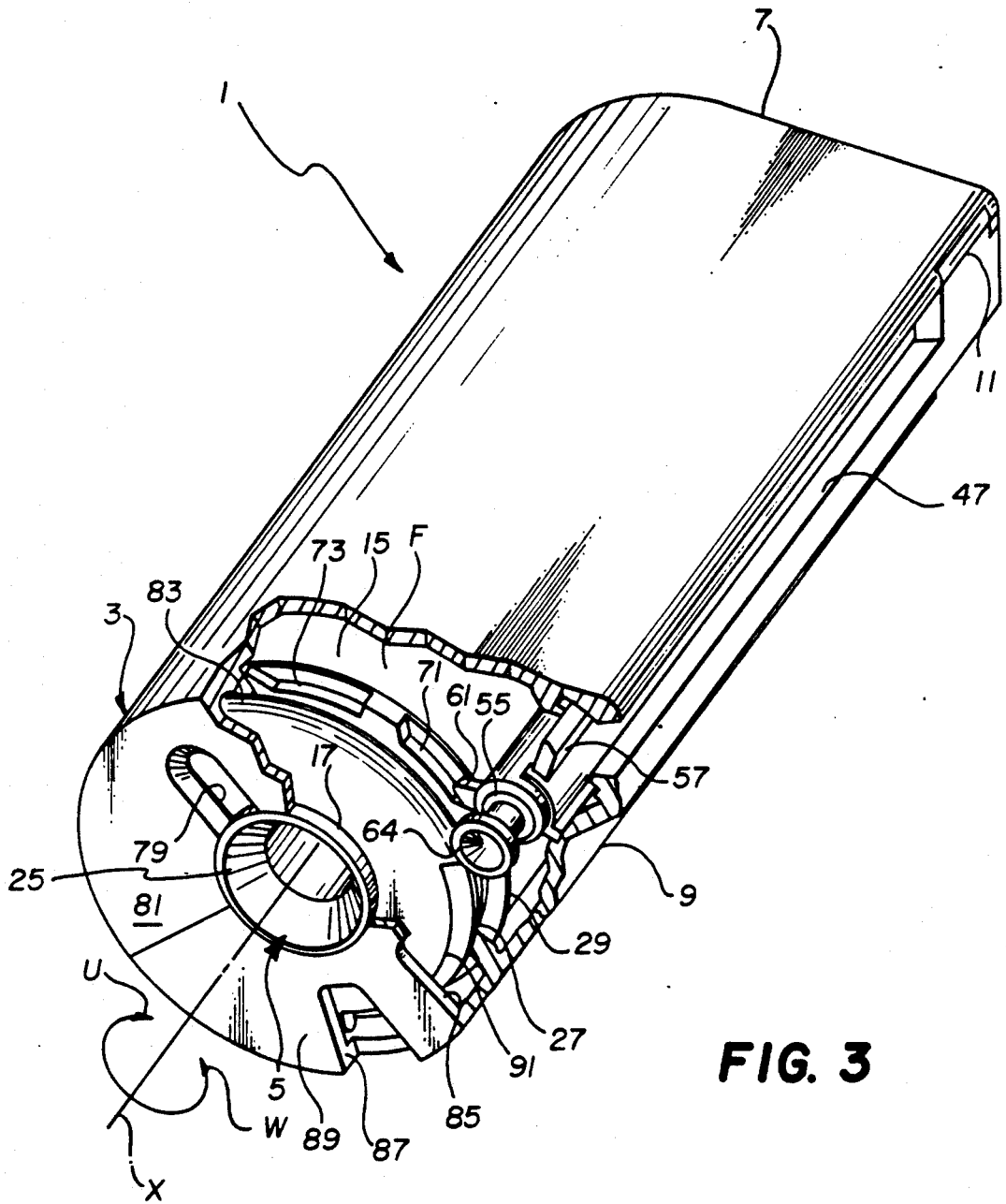
FIG. 3 is a perspective of the film cassette partly cut away.

Referring now to the drawings, FIGS. 1 and 2 show a 35 mm film cassette 1 comprising a cassette shell 3 and a film spool 5. The film spool 5 is rotatable about an axis X in film unwinding and film winding directions U and W inside the cassette shell 3. The cassette shell 3 consists of two shell halves 7 and 9 which are connected by a pair of spaced, integrally formed hinges 11 and 13 and otherwise are secured together by known means.

Figure 4:
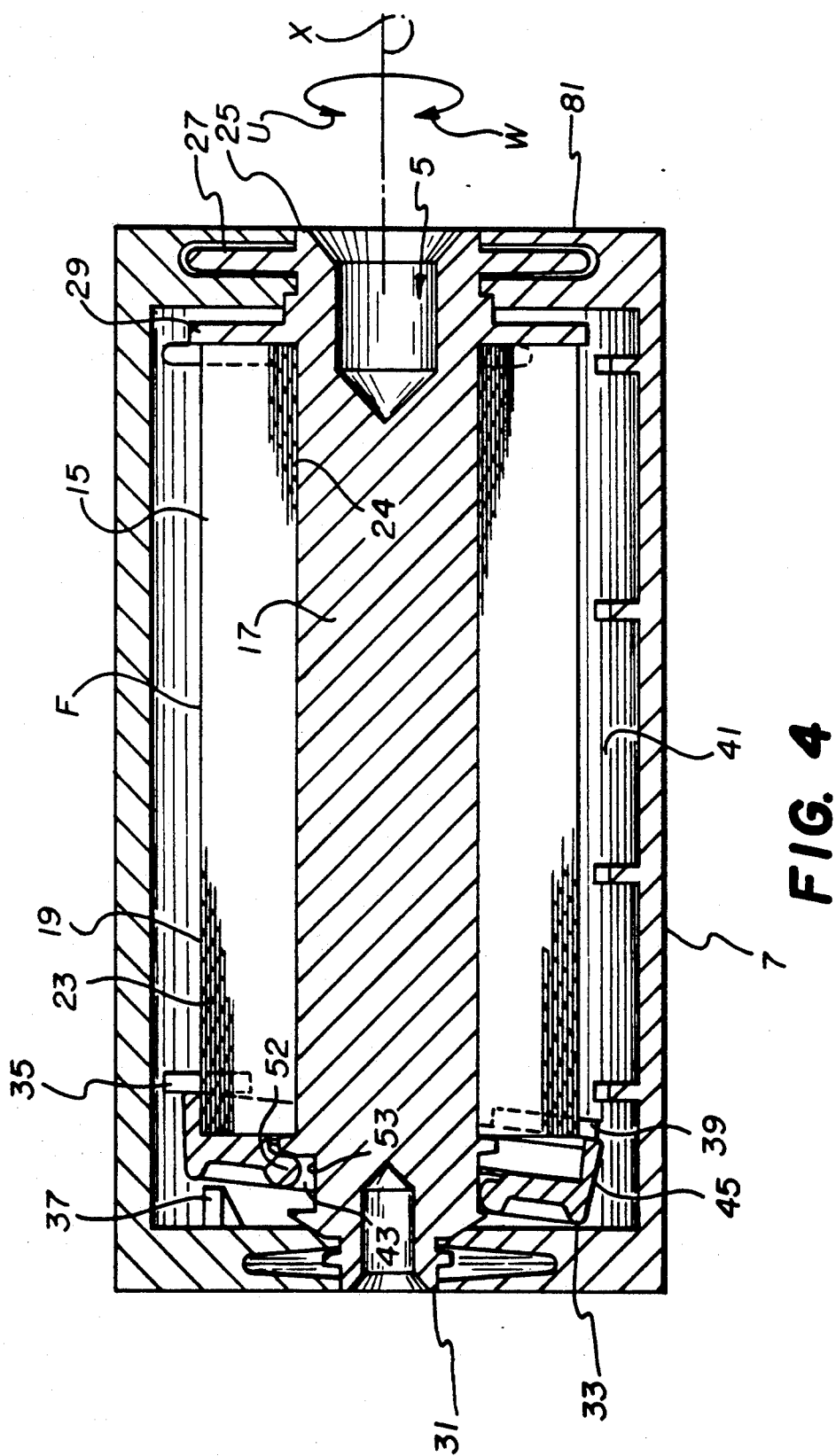
FIG. 4 is an elevation view in cross-section of the film cassette.
Figure 8:
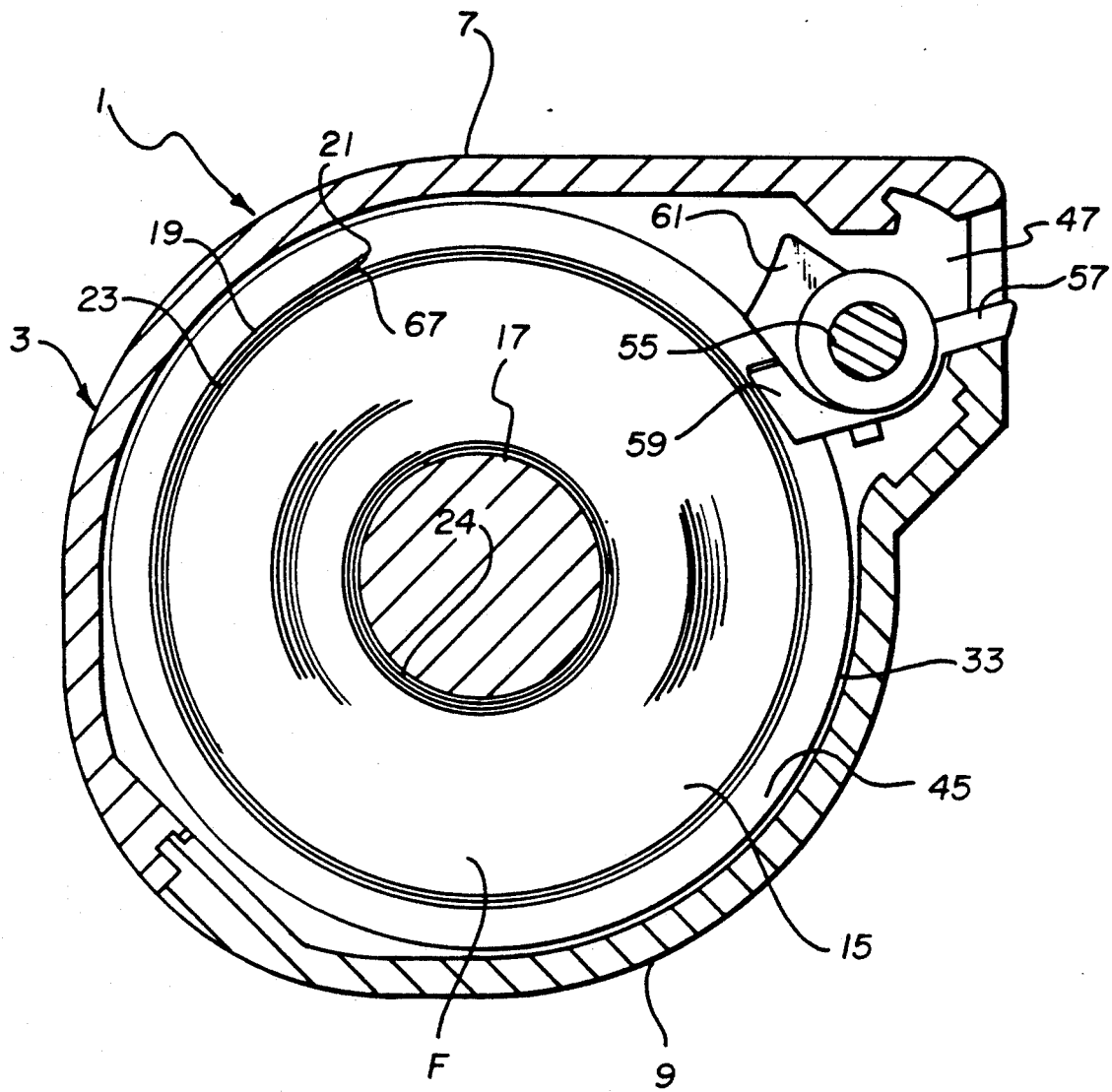
Figure 15:
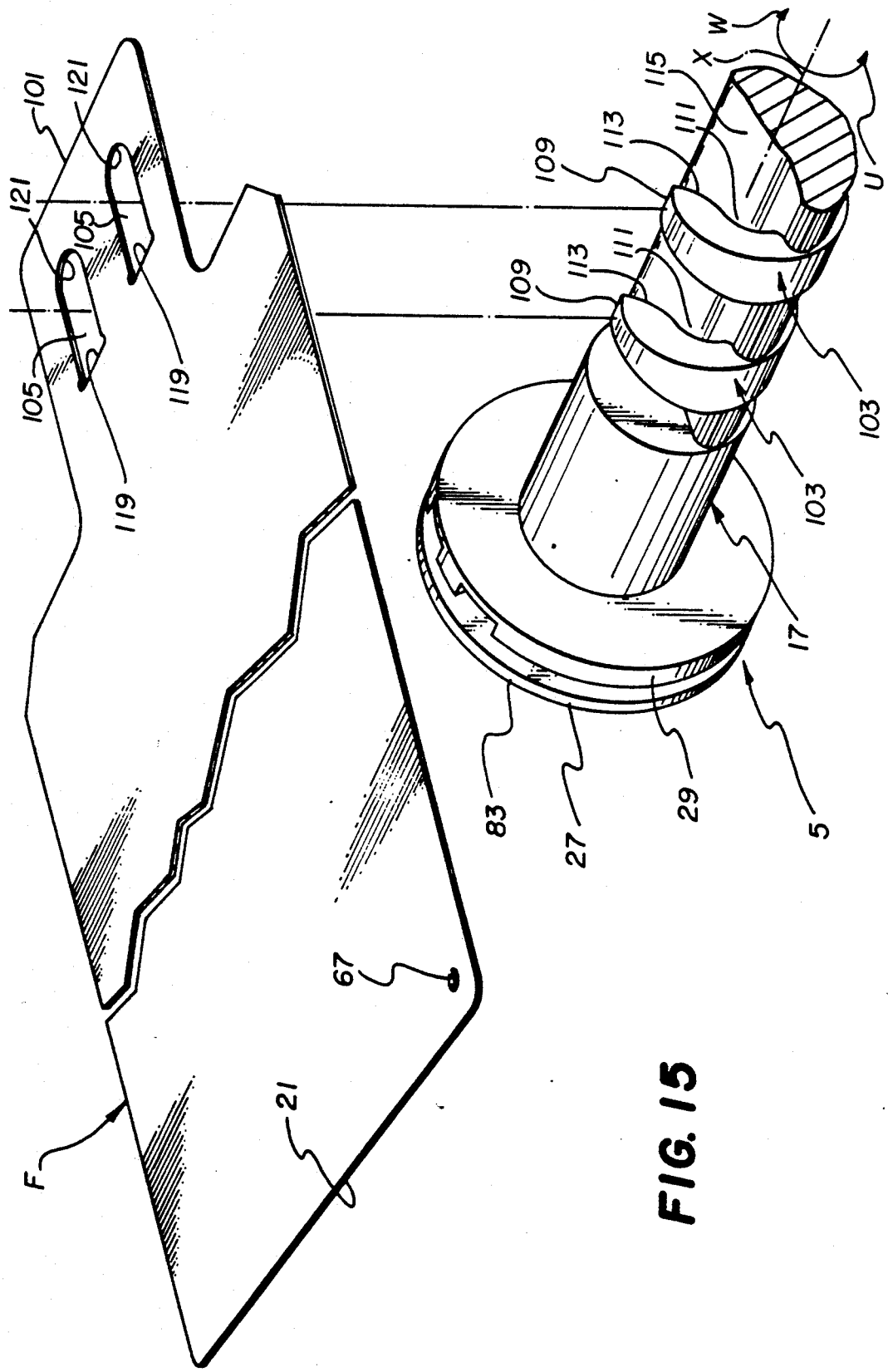
FIG. 15 is a perspective view of the spool core partly in section and an inner or trailing film end portion.
Figure 16:
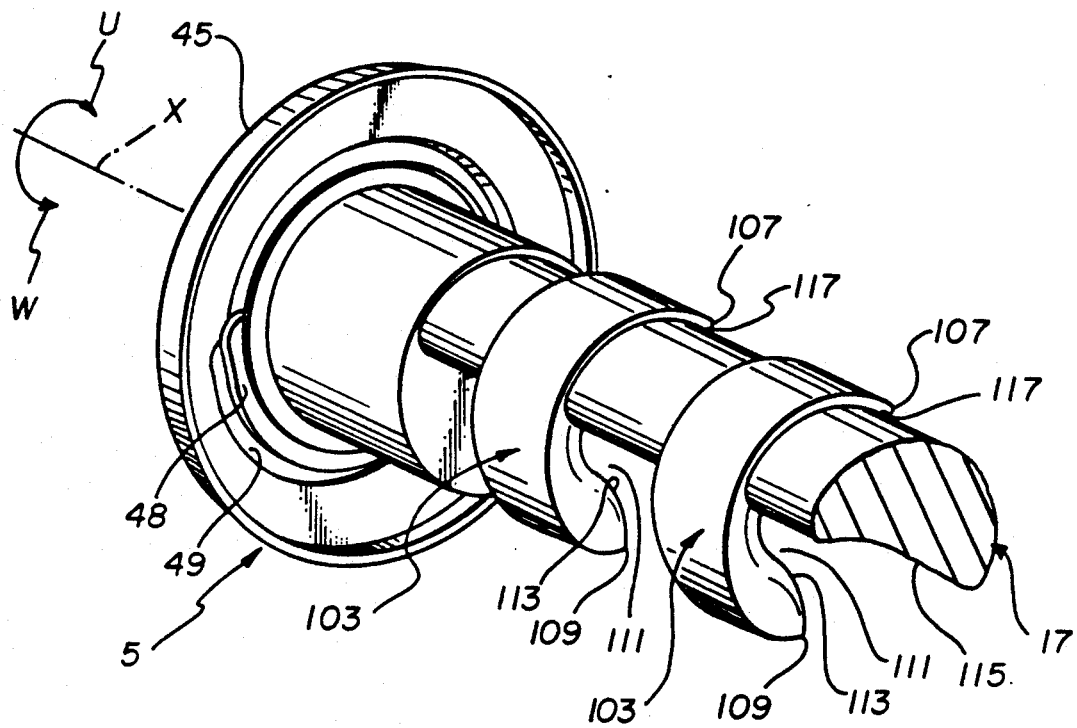
FIGS. 16 and 17 are perspective views of the spool core partly in section as seen from various angles not shown in FIG. 15.
Figure 17:
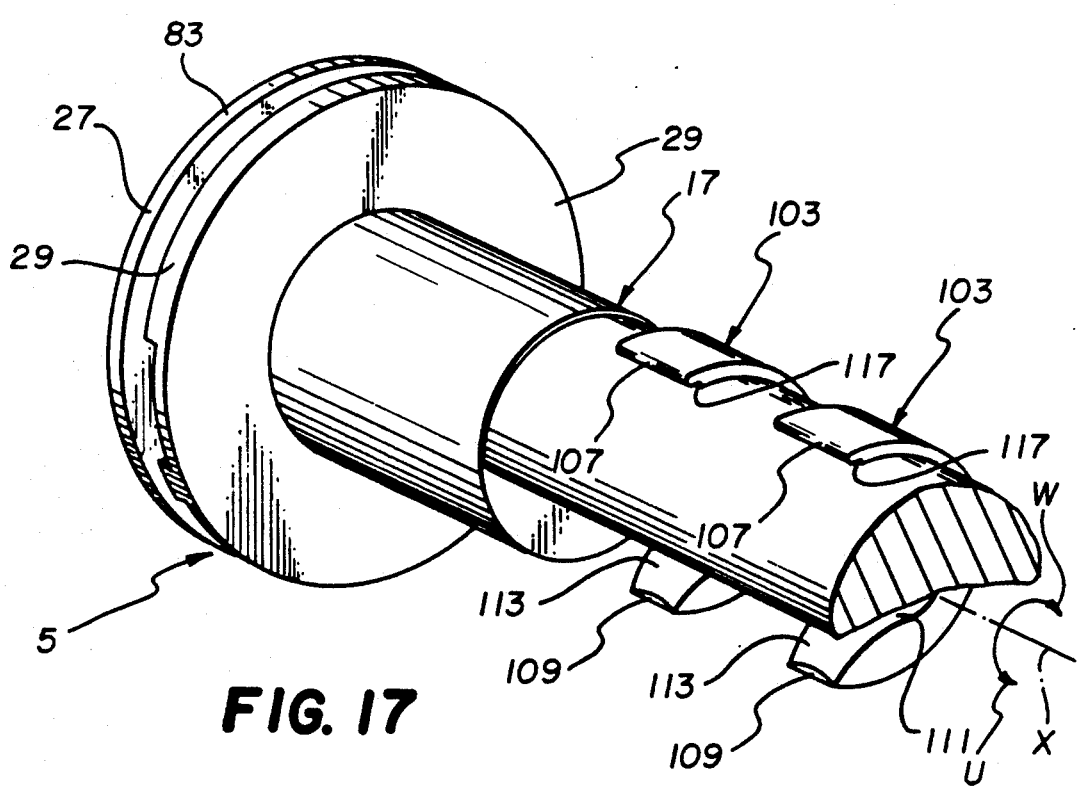
Figure 18:
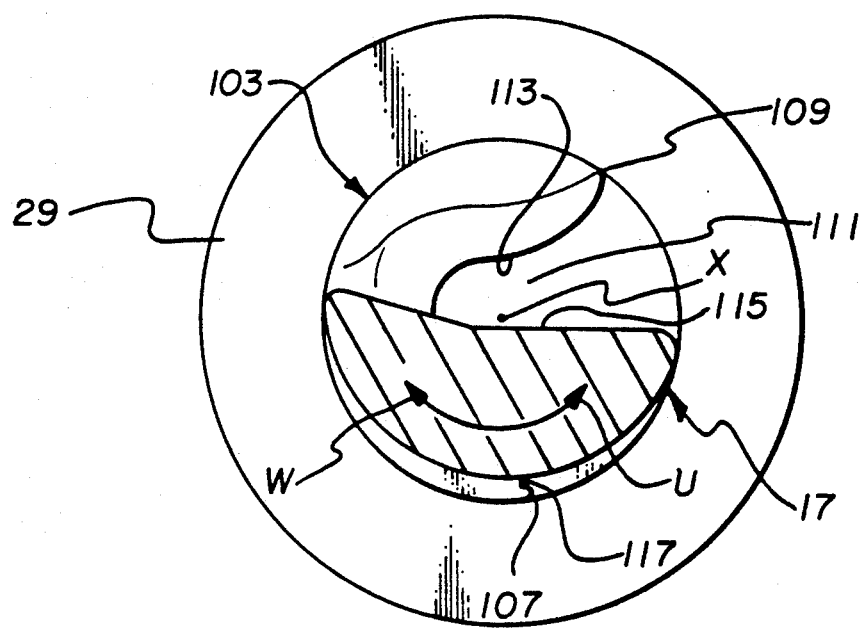
FIG. 18 is a plan view of the spool core partly in section.

A roll 15 of 35 mm filmstrip F is coiled about a core or hub 17 of the film spool 5 to form successive convolutions of the filmstrip. As shown in FIGS. 4 and 8, the film roll 15 includes an outermost convolution which is a film leader 19 having a leading or forward inclined end portion 21, and it includes a next inward convolution 23 coiled beneath the outermost convolution. An inner or trailing end portion 101 of an innermost convolution 24 of the film roll 15 is removably secured to the spool core 17 by a pair of identical double-hook pieces 103 fixed to the spool core. See FIG. 15.

Adjacent one end 25 of the spool core 17, a pair of parallel inner and outer rigid disks 27 and 29 are integrally formed with the spool core. Both of the disks 27 and 29 are arranged perpendicular to the axis X. See FIGS. 1-4. Adjacent another end 31 of the spool core 17, a rigid flange 33 is supported inclined to the axis X by four disk guides 35, 37 and 39, only three shown, projecting from an inner wall 41 of the shell half 7. Other disk guides, not shown, project from an inner wall 42 of the shell half 9. The flange 33 has a central opening 43 through which the spool core 17 extends to allow rotation of the spool core independently of the flange, and it includes an annular lip or skirt 45 which circumferentially extends from the flange. As shown in FIGS. 1 and 4, the inner disk 29 and the flange's annular lip 45 are spaced from each other a distance that is less than the width W of the filmstrip F for an approximately 270° F. arc that is remote from a film egress/ingress passageway 47 to outside the cassette shell 3, to radially confine the film leader 19 to the film roll 15 along that arc in order to substantially prevent clock-springing of the film roll against the respective inner walls 41, 42 of the shell halves 7, 9. Conversely, the inner disk 29 and the flange's annular lip 45 are spaced from each other a distance that is greater than the width W of the filmstrip F for an approximately 90° arc that is close to the passageway 47, to allow the film leader 19 beginning with its leading end portion 21 to escape the radial confinement of the flange's annular lip along that arc in order to enter the passageway. A functionally similar arrangement is disclosed in commonly assigned U.S. Pat. No. 4,832,275, issued May 23, 1989.

The Film Cassette—Flange To Spool Core Engagement

Figure 5:
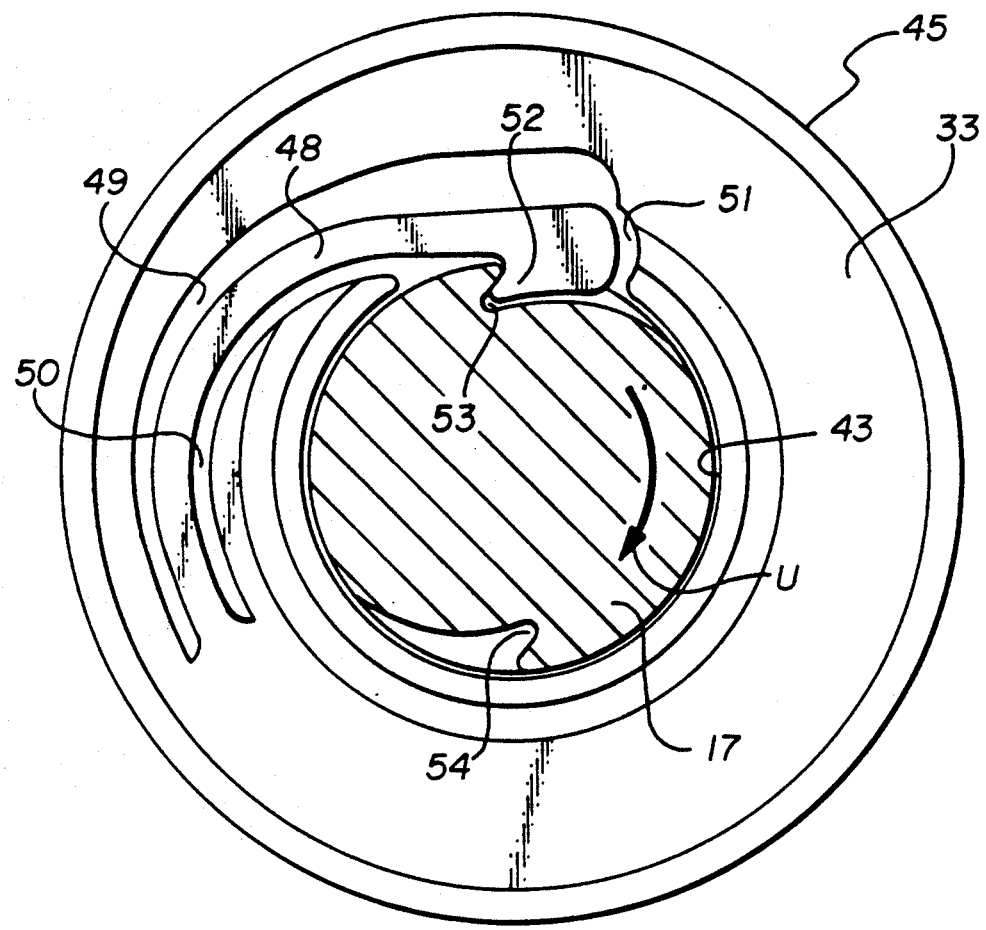
FIG. 5 is a plan view in cross-section of a flange to spool core engagement in the film cassette.

The flange 33 includes an integrally formed resilient cantilever 48 bordered by a pair of longitudinal slits or openings 49 and 50 cut in the flange to interconnect at a common opening 51 to the central opening 43 of the flange. See FIG. 5. The cantilever 48 has a free end portion at the common opening 51 which defines a locking pawl 52 that is inherently biased against the periphery of the spool core 17 at a location within the central opening 43, to drop into either one of two identical notches or detents 53 and 54 cut in the periphery of the spool core. When the locking pawl 52 rests against the periphery of the spool core 17, the cantilever 48 occupies the longitudinal slit 49. When the locking pawl 52 is in one of the detents 53, 54, it is removed from the longitudinal slit 49. The locking pawl 52 and the detents 53, 54 are complementarily shaped to locking engage the pawl and one of the detents when the spool core 17 is rotated relative to the flange 33 in the unwinding direction U. Once the locking pawl 52 and one of the detents 53, 54 are lockingly engaged, the flange 33 must rotate with the spool core 17 in the unwinding direction. Conversely, the locking pawl 52 and the detents 53, 54 are complementarily shaped to disengage the pawl and one of the detents and force the pawl onto the periphery of the spool core 17 when the spool core is rotated relative to the flange 33 in the winding direction W. Other details of the locking pawl 52 and the detents 53, 54 are disclosed in cross-referenced application Ser. No. 07/787,803. Another type of flange to spool core engagement arrangement is disclosed in commonly assigned U.S. Pat. No. 5,031,852, issued Jul. 16, 1991.

The Film Cassette—Unitary Film Stripper, Spool Lock and Light Valve

A control shaft 55 has an integrally formed light valve 57, film stripper 59 and spool lock 61. See FIGS. 1-4. The stripper 59 comprises the free end of a resilient cantilever 63 extending from the control shaft 55.

The control shaft 55 is rotatably supported within the cassette shell 3 by the shell halves 7 and 9. See FIGS. 1-3. Opposite ends 64 and 65 of the control shaft 55 are accessible at the exterior of the cassette shell 3 for engagement to rotate the control shaft.

Figure 6:
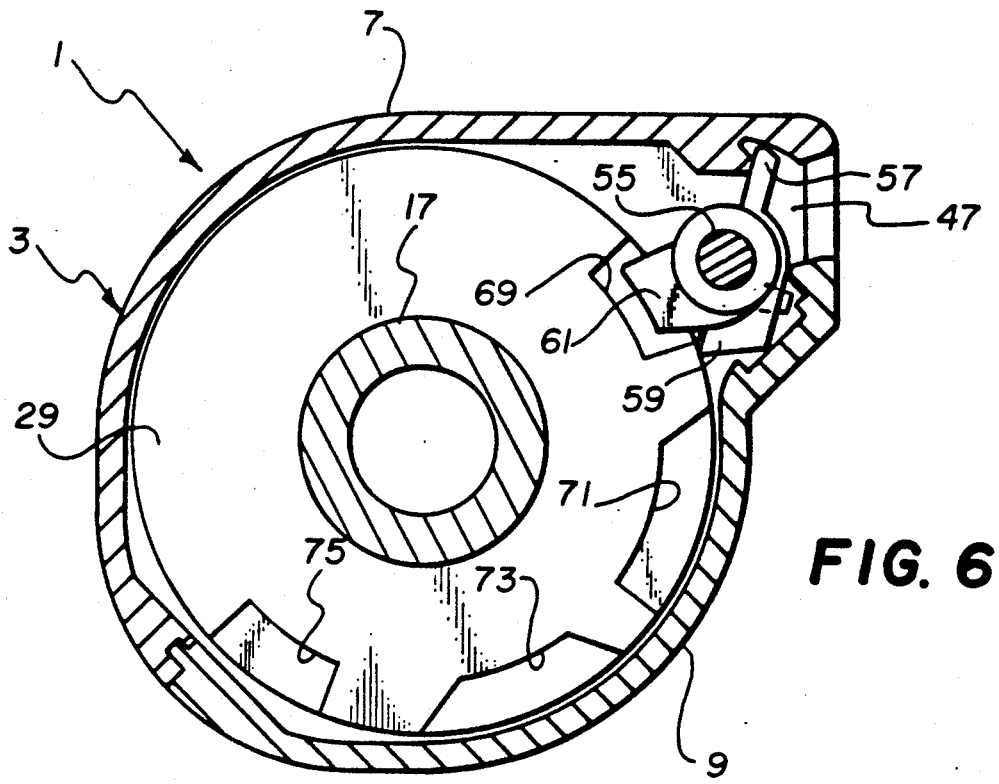
FIGS. 6–14 are either plan views in cross-section or end views of the film cassette, showing operation of a unified light valve, film stripper and spool lock.

As shown in FIG. 6, when the control shaft 55 is rotationally oriented with the light valve 57 in a light blocking or closed position extending across the film egress/ingress passageway 47 to prevent ambient light from entering the cassette shell 3 through the passageway, the film stripper 59 is in a non-stripping position removed from the film roll 15. Conversely, as shown in FIG. 8, when the control shaft 55 is rotationally oriented with the light valve in a non-blocking or opened position to allow movement of the filmstrip F through the passageway 47, the stripper 59 is in a stripping position to be received between the leading end portion 21 of the film leader 19 and the next-inward convolution 23 of the film roll 15 responsive to rotation of the film spool 5 in the unwinding direction U. Other details of the stripper 59 are disclosed in cross-referenced application Ser. No. 07/787,802. If the film spool 5 is rotated in the unwinding direction U with the stripper 59 in its stripping position, the film leader 19 beginning with the leading end portion 21 will be guided by the stripper from between the flange's annular lip 33 and the inner disk 29 into the passageway 47. A protuberance 67 may be provided on the underside of the film leader 19 at a location along its leading end portion 21 to normally lie against the outerside of the next-inward film convolution 23, to maintain a slight space between the leading end portion and the next-inward film convolution for receipt of the stripper 59. See FIG. 8.

Figure 7:
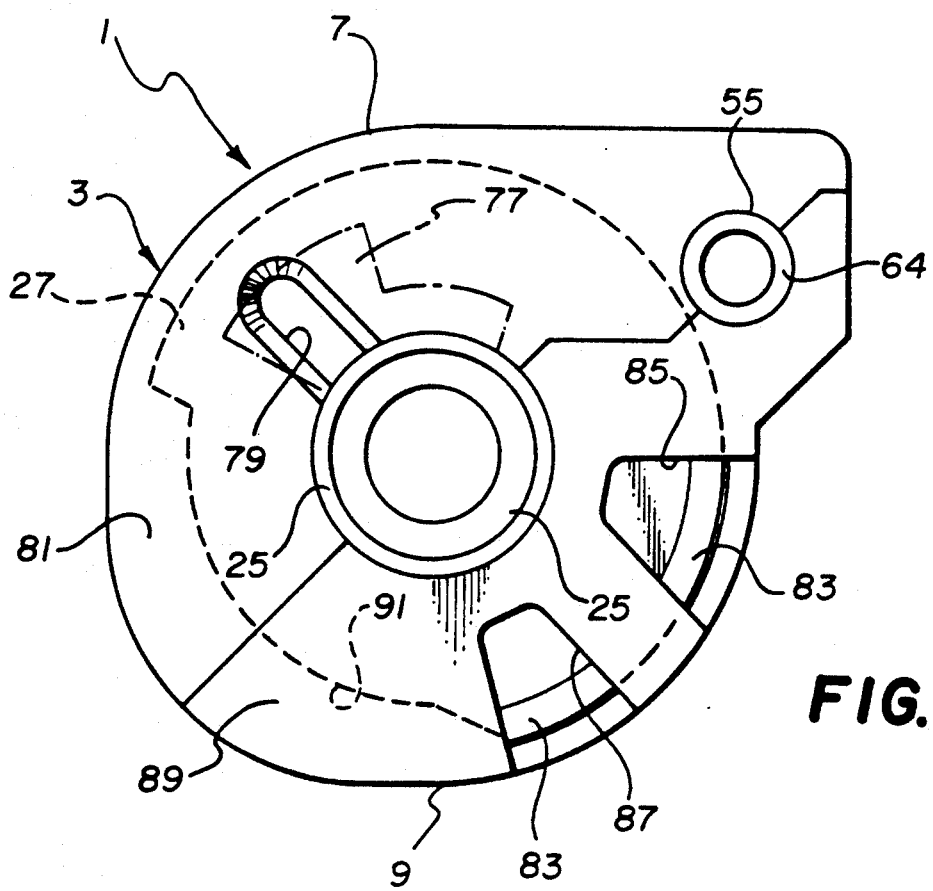
Figure 9:
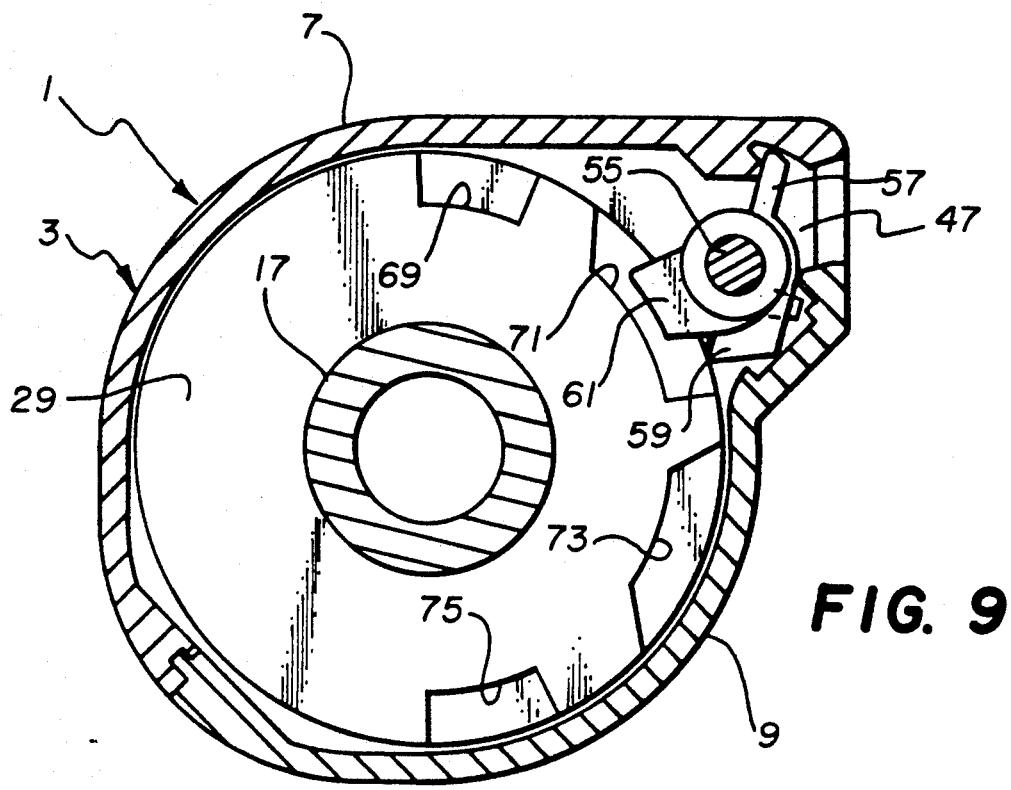
Figure 10:
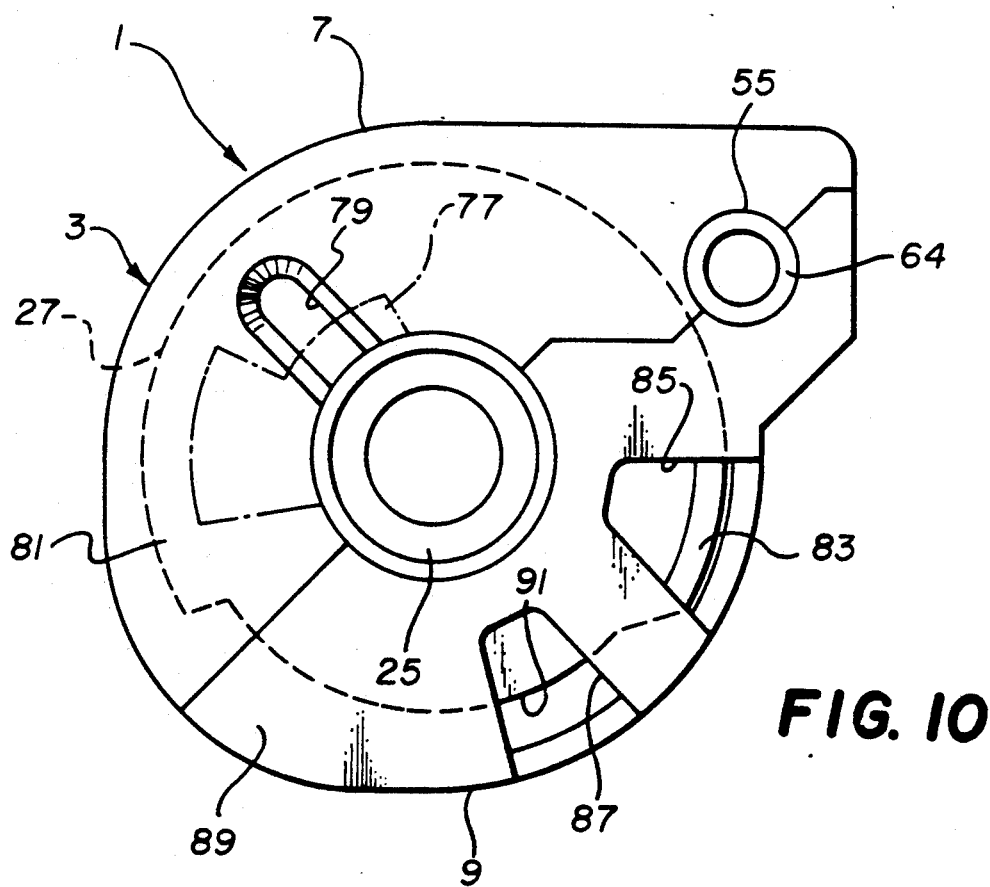
Figure 11:
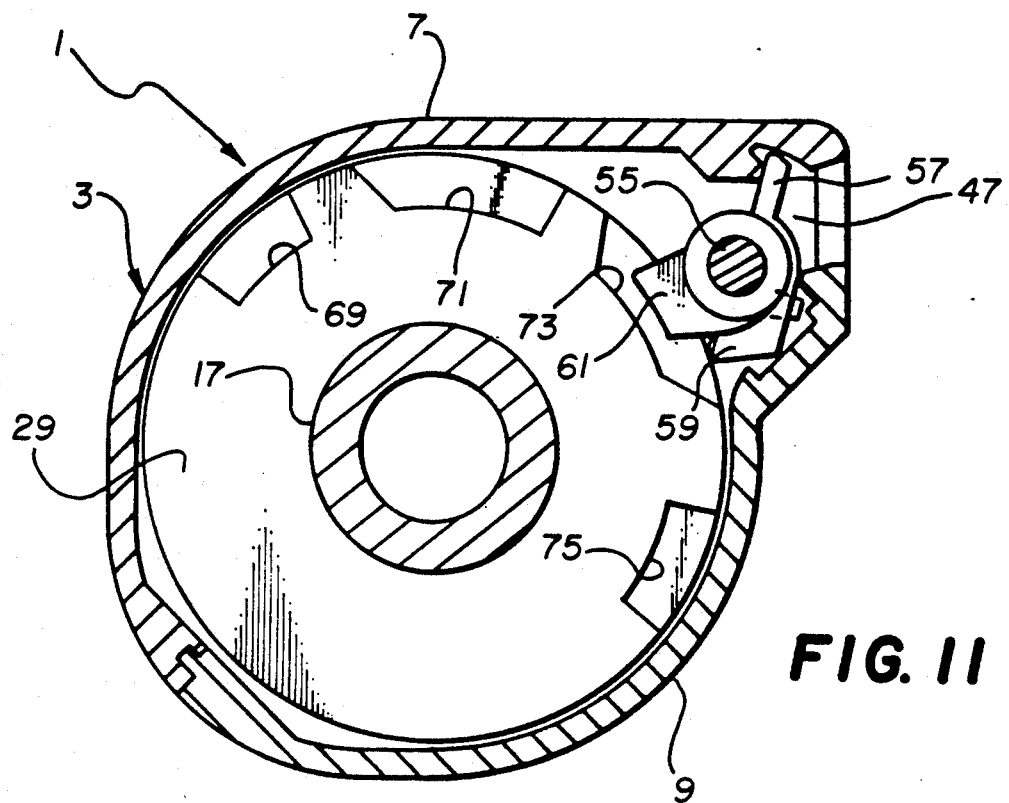
Figure 12:
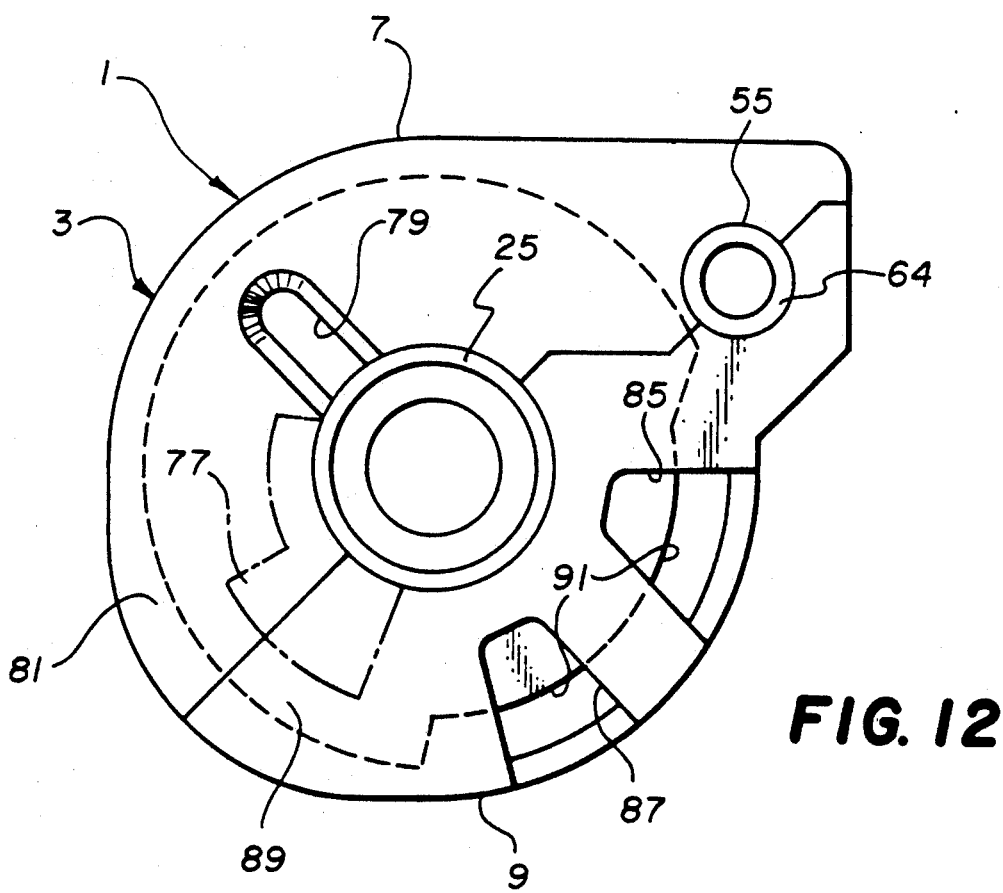
Figure 13:
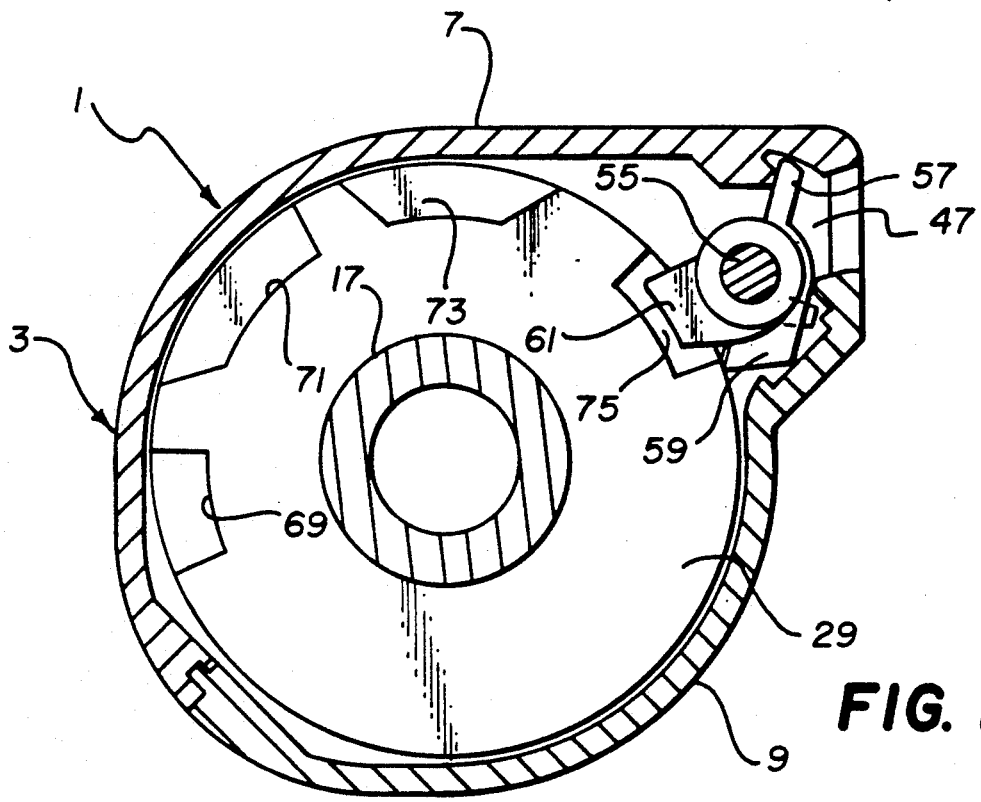
Figure 14:
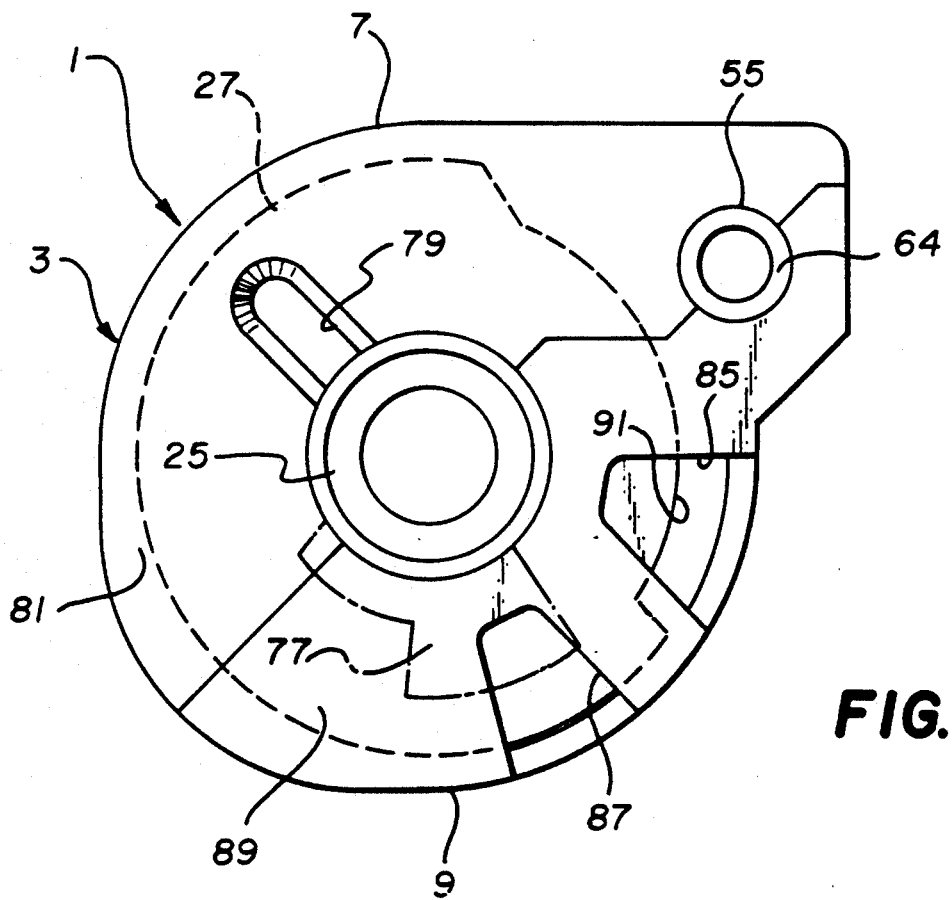

As shown in FIGS. 2 and 8, when the control shaft 55 is rotationally oriented with the light valve 57 in its non-blocking position, the spool lock 61 is in a non-locking position removed from the inner disk 29. Conversely, as shown in FIG. 6, when the control shaft 55 is rotationally oriented with the light valve 57 in its light blocking position, the spool lock 61 is in a locking position protruding into any one of four notches or detents 69, 71, 73 and 75 cut in the periphery of the inner disk 29, to prevent substantial rotation of the film spool 5 in the unwinding and winding directions U and W. Other details of the spool lock 61 are disclosed in cross-referenced application Ser. No. 07/787,356. When the spool lock 61 protrudes into the detent 69, the film spool 5 is rotationally arrested with a film exposure status indicator 77 completely filling a window 79 in one end 81 of the shell half 7, to visibly indicate the filmstrip F is unexposed (fresh). See FIGS. 6 and 7. Moreover, a beveled edge portion 83 of the outer disk 27 is present at two windows 85 and 87 in the end 89 of the shell half 9, to disable a cassette load prevention mechanism in a camera or other apparatus adapted to receive the film cassette 1. See FIG. 7. An example of the cassette load prevention mechanism is disclosed in commonly assigned U.S. Pat. No. 5,032,861, issued Jul. 16, 1991, and U.S. Pat. No. 5,047,794, issued Sep. 10, 1991. When the spool lock 61 protrudes into the detent 71, the film spool 5 is rotationally arrested with the exposure status indicator 77 only partly filling the window 79 to visibly indicate the filmstrip F is partly exposed. See FIGS. 9 and 10. Moreover, the beveled edge portion 83 is only present at the window 85. A cut-out edge portion 91 of the outer disk 27 is present at the window 87. See FIG. 10. Consequently, the cassette load prevention mechanism would be disabled at the window 87 but not at the window 85. This permits the film cassette 1 to be used with two different types of cameras, one that can receive the film cassette with the filmstrip F either partly exposed or unexposed and the other that can receive the film cassette only with the filmstrip unexposed. When the spool lock 61 protrudes into the detent 73, the film spool 5 is rotationally arrested with the exposure status indicator 77 completely removed from the window 79 to visibly indicate the filmstrip F is fully exposed. See FIGS. 11 and 12. Moreover, the cut-out edge portion 91 is present at the windows 85 and 87. See FIG. 12. Consequently, the cassette load prevention mechanism would be disabled at the windows 85 and 87. This is in order to prevent any type camera from receiving the film cassette 1 with the filmstrip F fully exposed. When the spool lock 61 protrudes into the detent 75, the film spool 5 is rotationally arrested with the exposure status indicator 77 completely removed from the window 79. However, another indicator, not shown, may be provided on the outer disk 27 to be present at the window 79 to visibly indicate the filmstrip F has been processed to develop any latent images. See FIGS. 13 and 14. Moreover, the cut-out edge portion 91 is present at the window 85 and the beveled edge portion 83 is present at the window 87. See FIG. 14. Consequently, the cassette load prevention mechanism would be disabled at the window 85 but not the window 87. This is in order to allow the film cassette 1 only to be received in apparatus other than a camera, such as an image display device, which would make use of the filmstrip F when it is processed.

The Film Cassette—The Spool Hook

As shown in FIGS. 15-18, the trailing end portion 101 of the filmstrip F has a pair of identical holes 105 in it. Each of the identical double-hook pieces 103, 103 of the spool core 17 has a shorter hook 07 and a longer hook 109. An undercut 111 in the spool core 17 beneath the longer hooks 109, 109 extends from respective undersides 113, 113 of the longer hooks to a flat 115 of the spool core substantially at the axis X. An undercut 117 in the spool core 17 beneath the shorter hooks 107, 107 is significantly shallower than the undercut 113.

Figure 19:
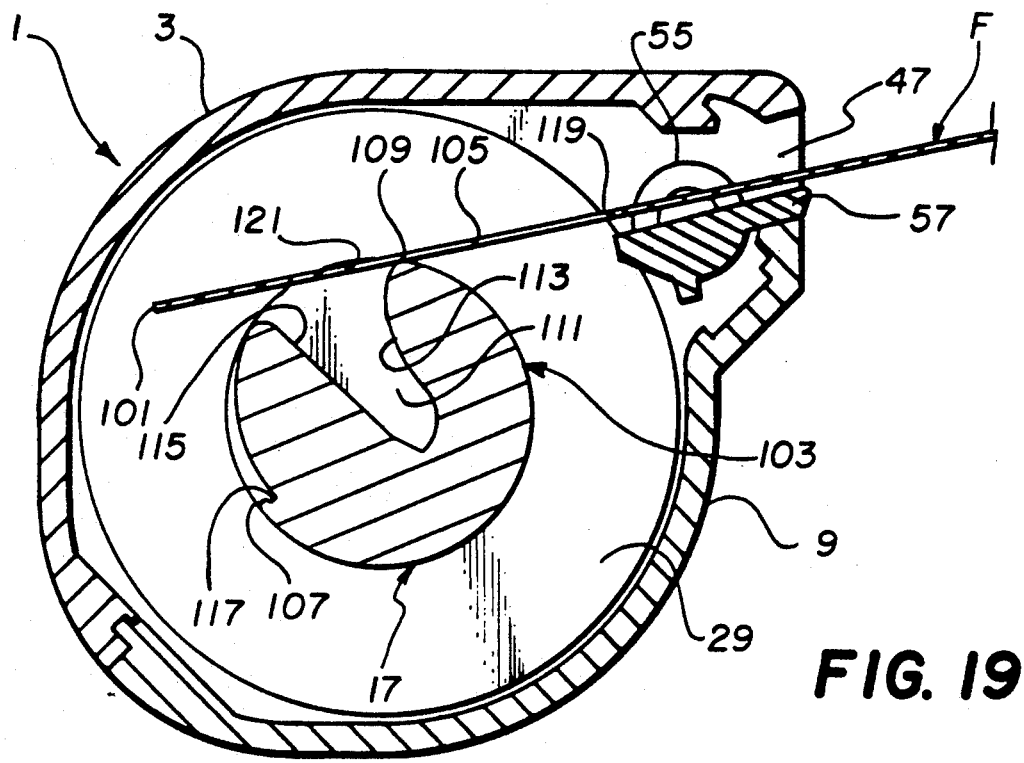
FIGS. 19–24 are plan views in cross-section of the film cassette, showing the manner of attaching the inner or trailing film end portion to the spool core.
Figure 20:
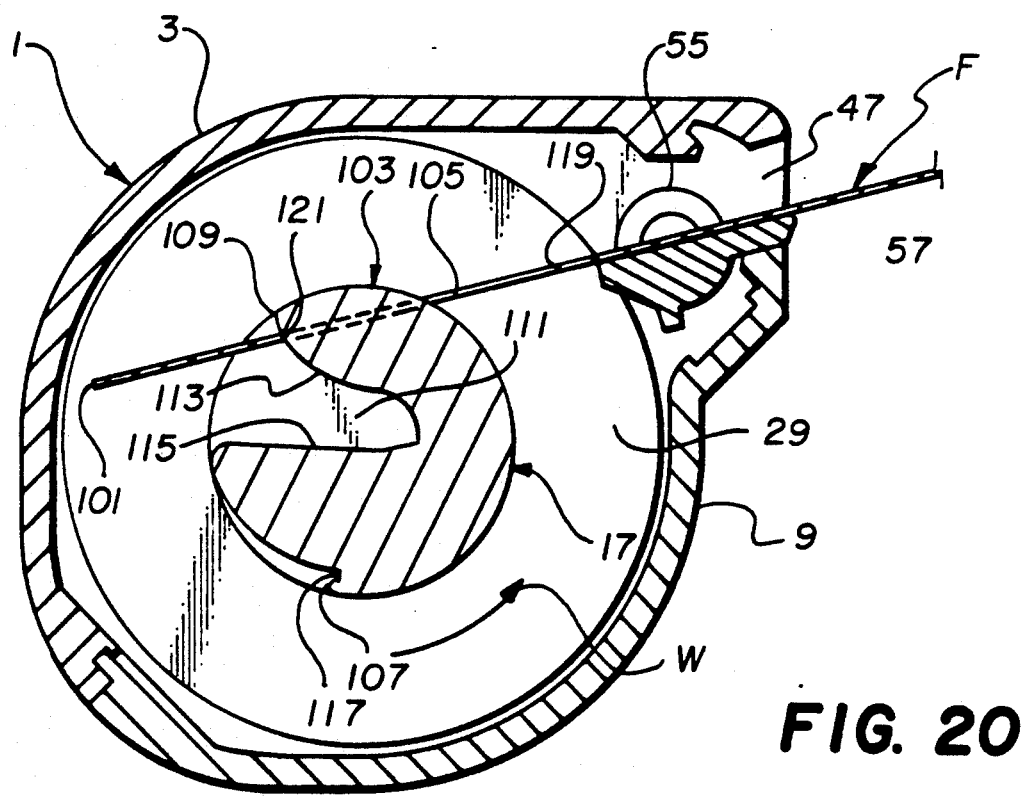
Figure 21:
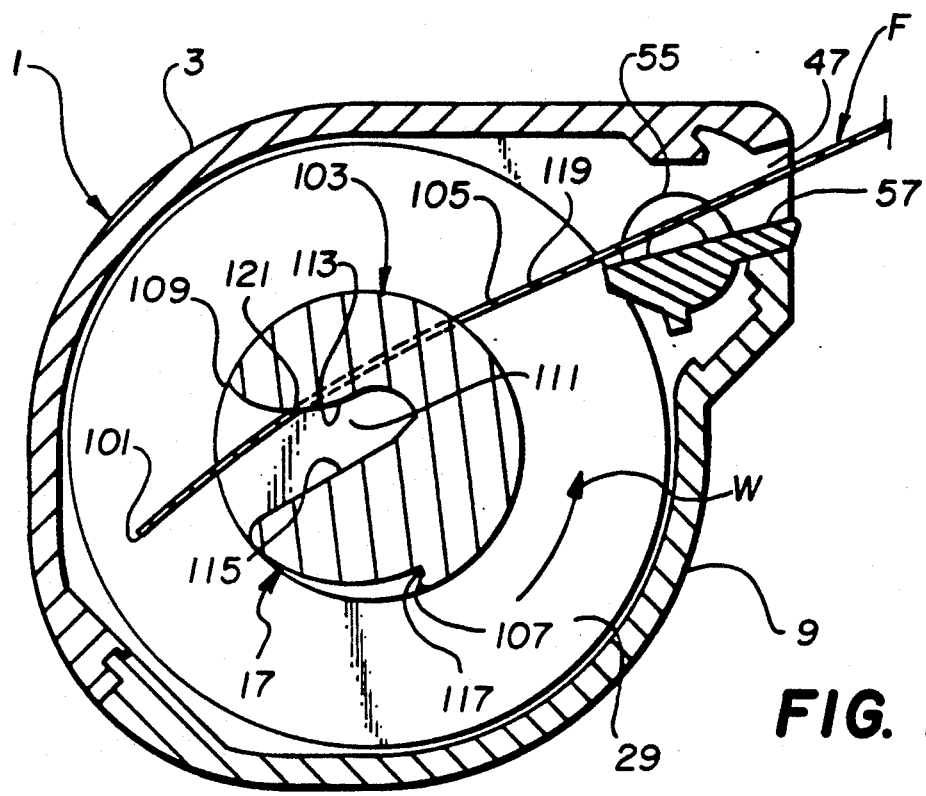
Figure 22:
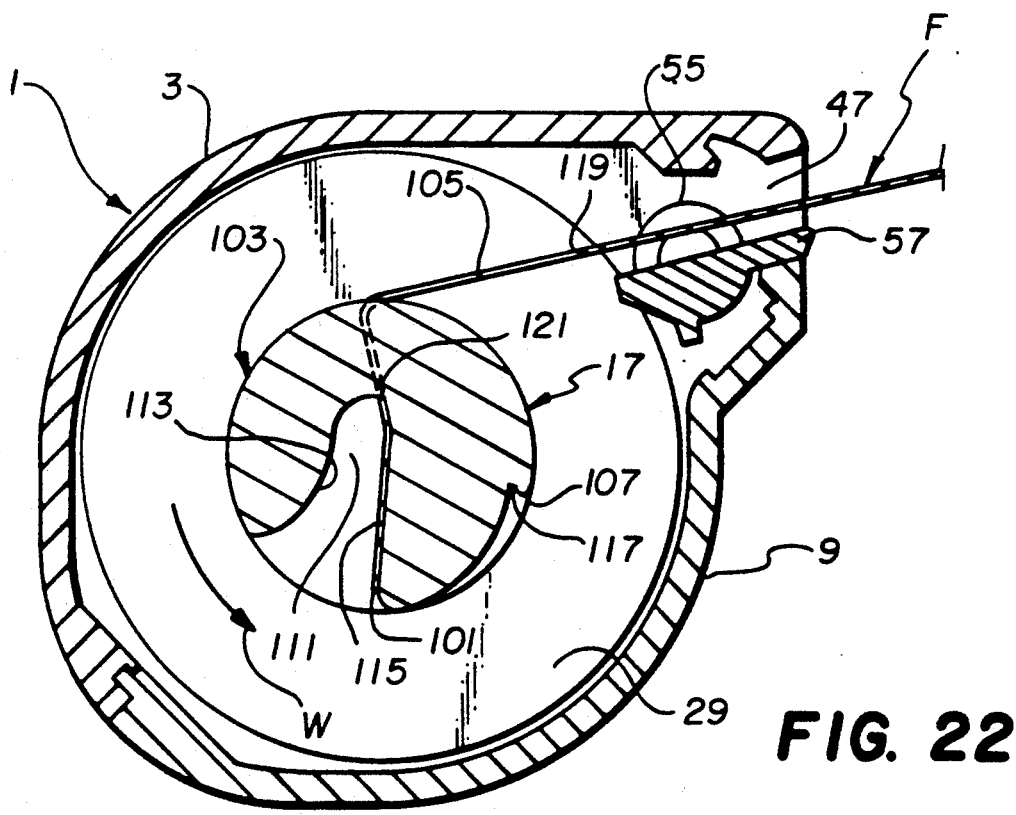
Figure 23:
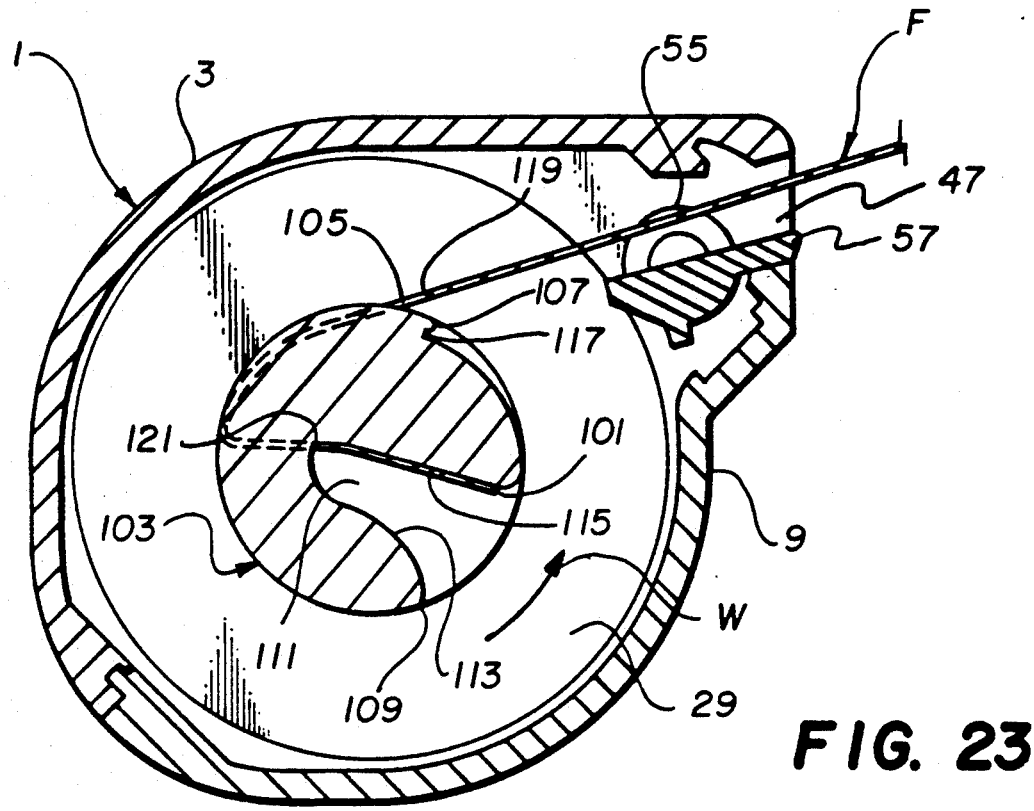
Figure 24:
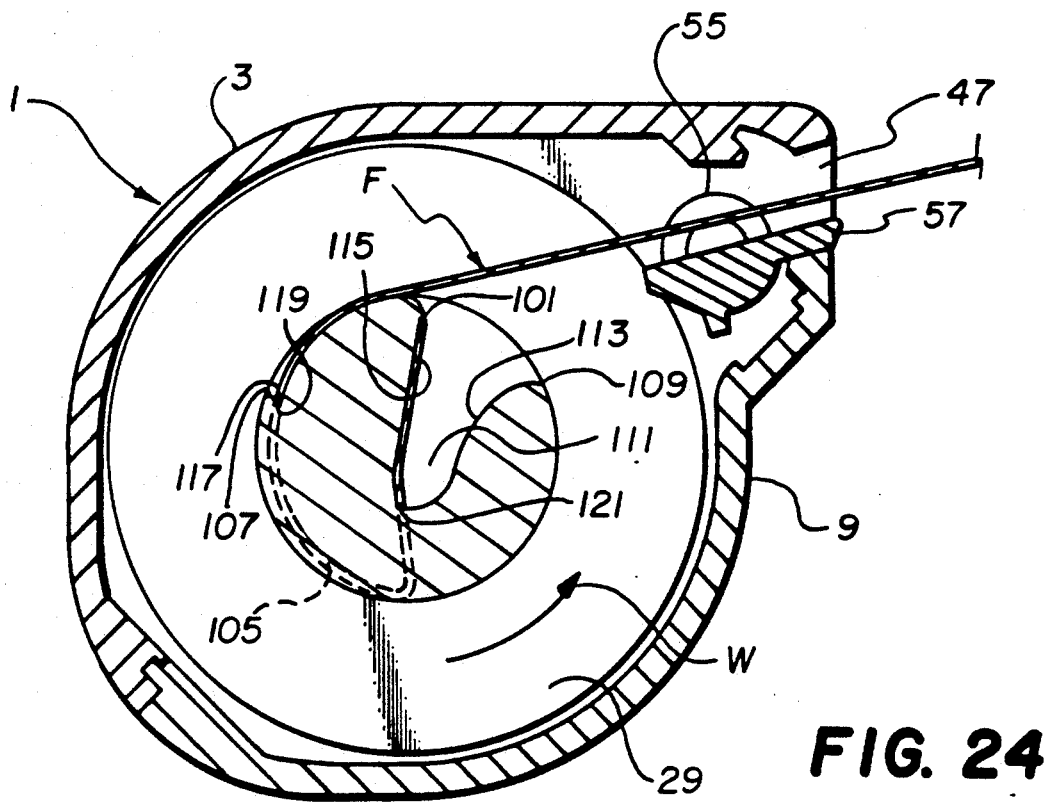

To attach the trailing end portion 101 of the filmstrip F to the double-hook pieces 103, 103, the trailing end portion is laid across the spool core 17 with the double-hook pieces located opposite the respective holes 105, 105 in the trailing end portion. See FIG. 19. Then, as shown in FIGS. 20-24, rotation of the spool core 17 in the winding direction W first moves the longer hooks 109, 109 into the respective holes 105, 105 and then moves the shorter hooks 107, 107 into the respective holes. As can be seen in FIGS. 20-22, movement of the longer hooks 109, 109 into the respective holes 105, 105 causes the undersides 113, 113 of these hooks to pull the trailing end portion 101 to the center or axis X of the spool core 17 where it is stopped by the flat 115.

Figure 25:
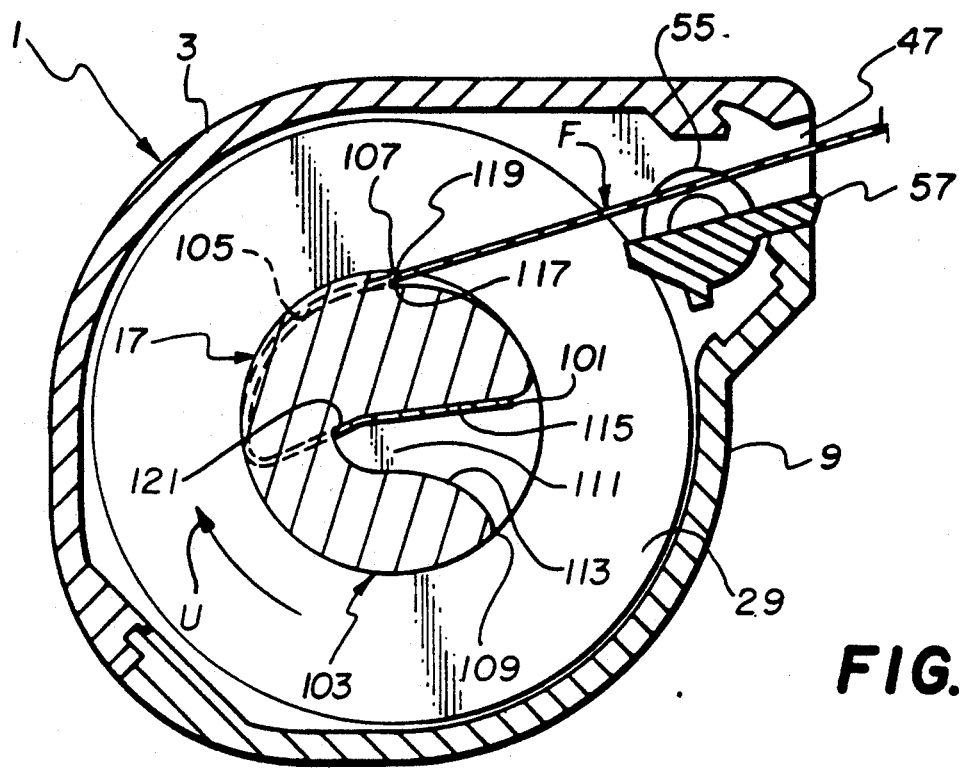
FIGS. 25–27 are plan views in cross-section of the film cassette, showing the manner of detaching the inner or trailing film end portion from the spool core.
Figure 26:
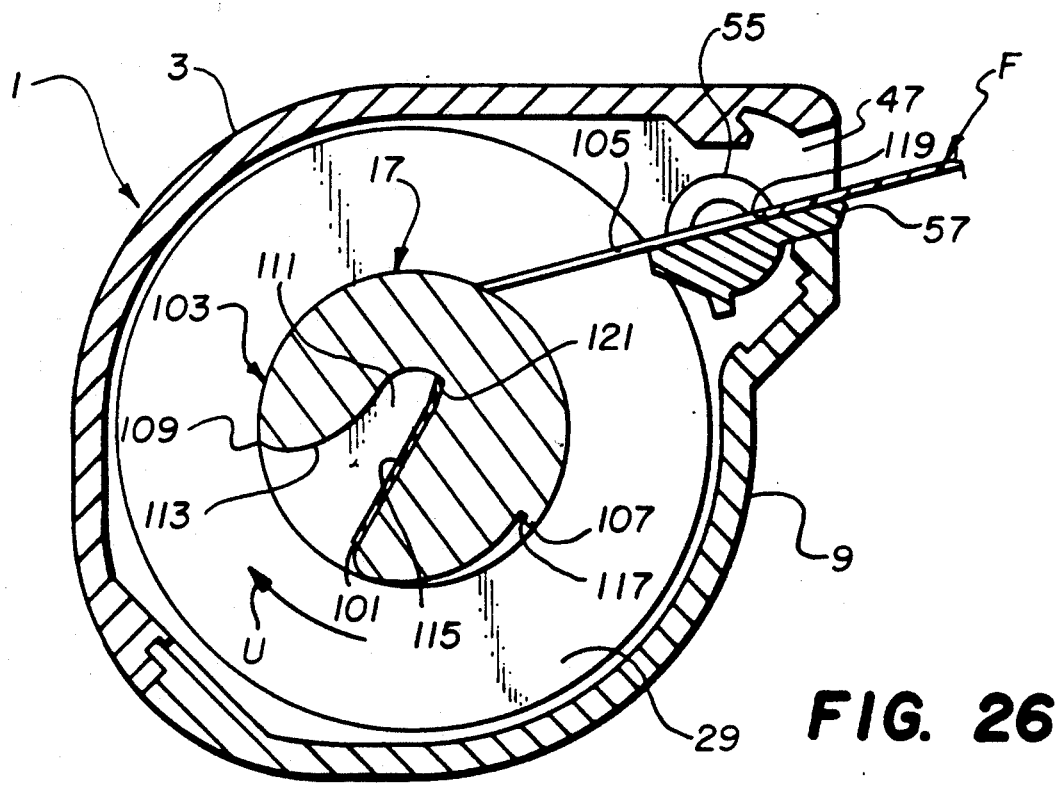

When the double-hook pieces 103, 103 are in the respective holes 105, 105, the shorter hooks 107, 107 are intended to project from the respective holes in the unwinding direction U to slightly overlie the trailing end portion 101 at individual edges 119, 119 of the respective holes to engage the trailing end portion for pushing the leading end portion 21 off the spool core 17 responsive to unwinding rotation of the spool core. See FIGS. 8, 15 and 25. Conversely, when the filmstrip F except for the trailing end portion 101 is wound off the spool core 17, the shorter hooks 107, 107 will exit the respective holes 105, 105 because the undercut 117 at each of the hooks is relatively shallow. See FIGS. 25 and 26.

Figure 27:
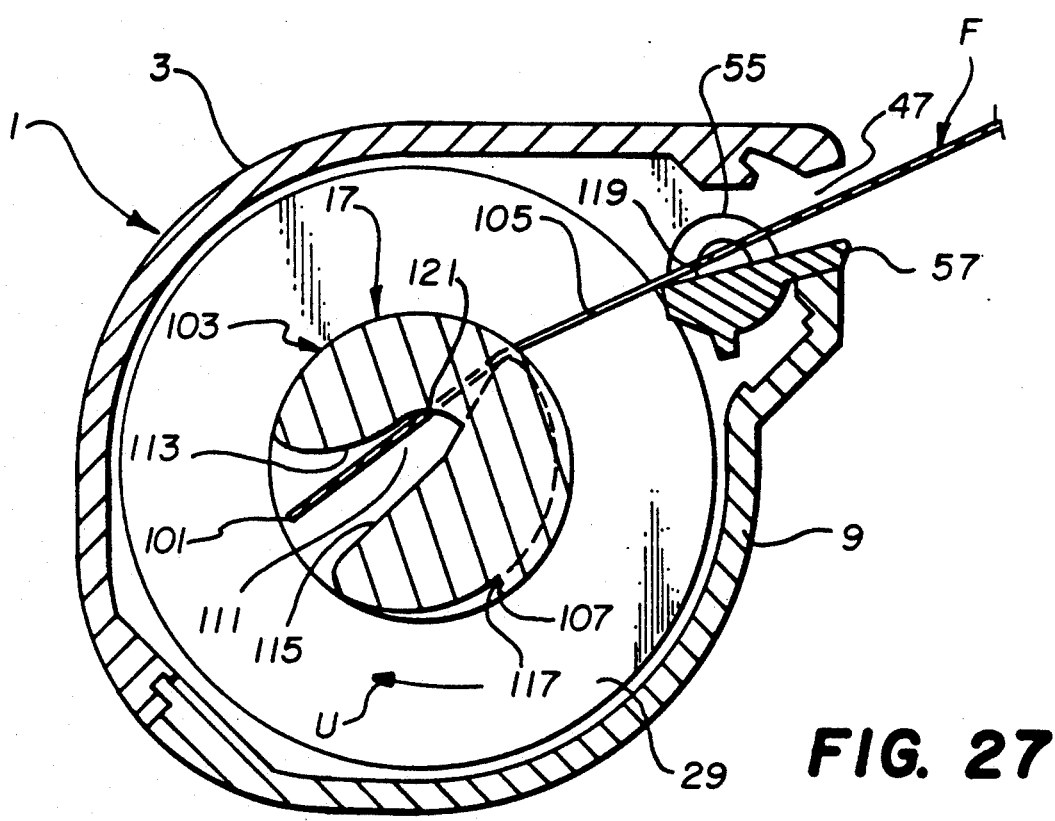

When the double-hook pieces 103, 103 are in the respective holes 105, 105, the longer hooks 109, 109 are intended to project from the respective holes in the winding direction W to substantially overlie the trailing end portion at individual edges 121, 121 of the respective holes to engage the trailing end portion for preventing it from completely separating from the spool core once the shorter hooks 107, 107 have exited the respective holes. See FIGS. 15 and 27. However, the longer hooks 109, 109 owing to their shape can be backed out of the respective holes 105, 105 by rotating the spool core 17 relative to the trailing end portion 101 in the unwinding direction U.

Cassette Operation

Initially, the control shaft 55 must be rotated to move the light valve 57 from its light blocking position to its non-blocking position, to move the spool lock 61 from its locking position to its nonlocking position, and to move the film stripper 59 from its non-stripping position to its stripping position. See FIGS. 6 and 7.

Then, the spool core 17 is rotated relative to the flange 33 in the unwinding direction U until the two pieces are lockingly engaged by means of the locking pawl 52 and one of the detents 53, 54. See FIG. 5. Continued rotation of the spool core 17 in the same direction will similarly rotate the flange 33 to allow successive longitudinally sections of the filmstrip F beginning with its leading end portion 21 to exit from between the flange's annular lip 45 and the inner disc 29 along the 90° arc close to the film egress/ingress passageway 47 where the lip and the disc are spaced from each other a distance that is greater than the width W of the filmstrip F. Simultaneously, the film stripper 59 will direct successive longitudinal sections of the filmstrip F beginning with its leading end portion 21 into the passageway 47 for advancement outside the cassette shell 3.

The Camera

Figure 28:
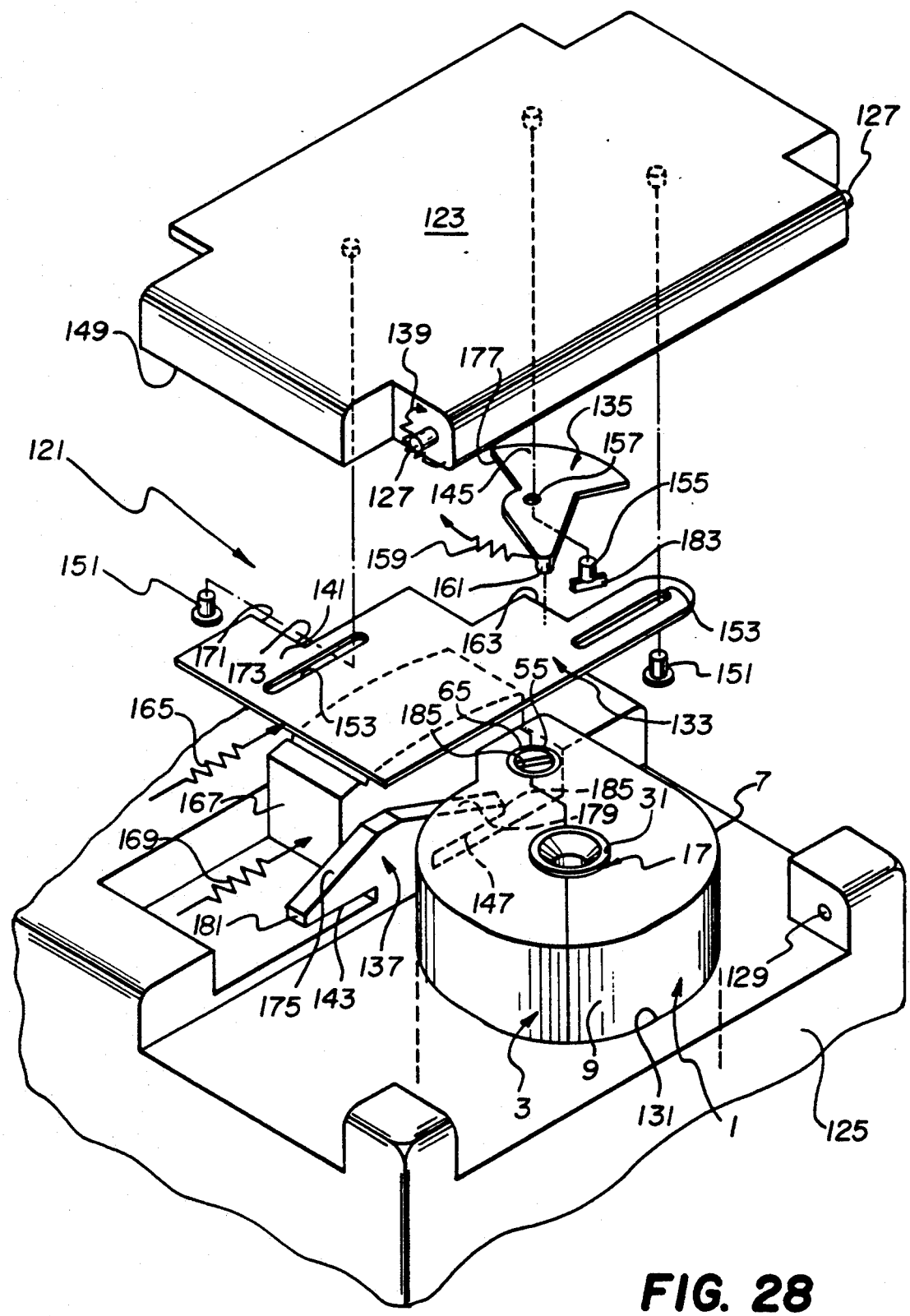
FIG. 28 is an exploded perspective view of an interlock for a camera and the film cassette, according to a preferred embodiment of the invention.
Figure 29:
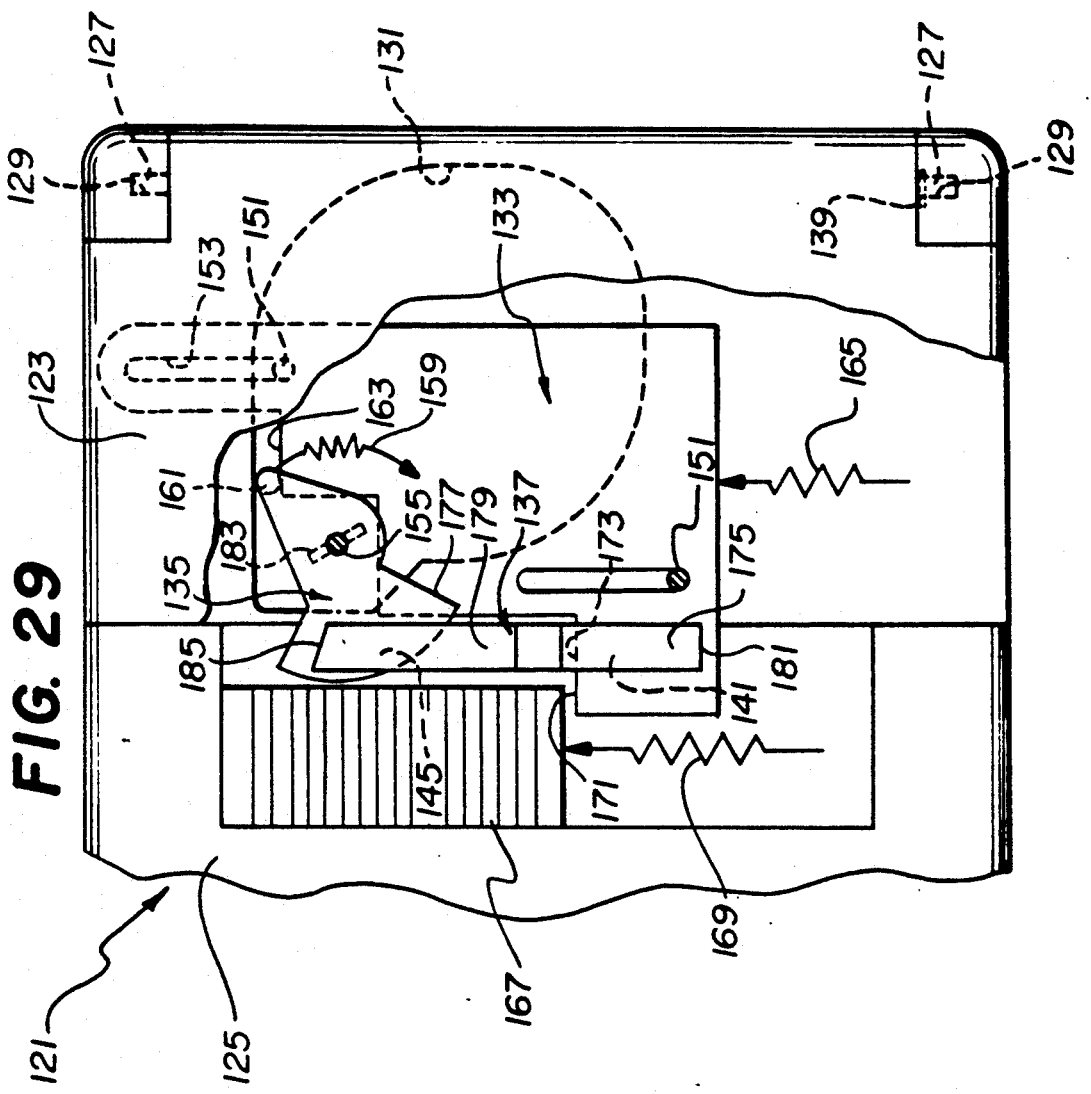
Figure 30:
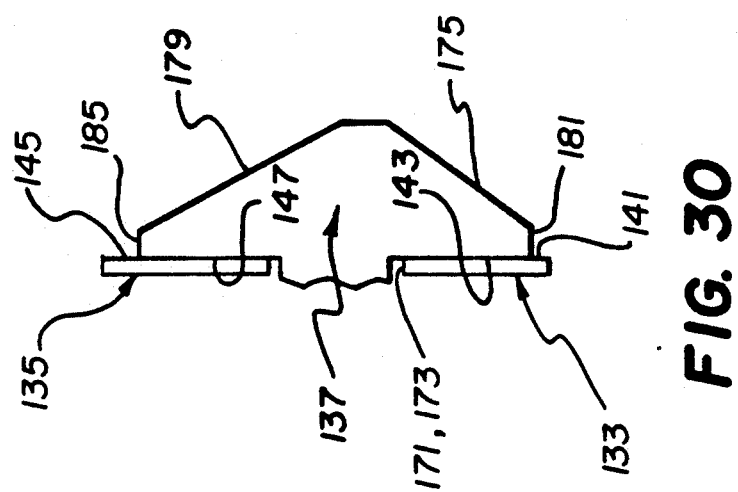

A camera 121 to be used with the film cassette 1 includes a door 123 attached to a body or housing 125 via a pair of pivot pins 127 rotatably supported in respective coaxial holes 129, to permit the door to be opened and closed to uncover and recover a loading chamber 131 for the film cassette 1. See FIG. 28. The door 123 can be held closed by one or both movable latches 133 and 135 when in individual engagement with a fixed element 137, to prevent an opening spring 139 from popping the door open. The first latch 133 has a flat surface 141 that is received beneath a first underside 143 of the fixed element 137 to engage the first latch to the fixed element. The second latch 135 has a flat surface 145 that is received beneath a second underside 147 of the fixed element 137 to engage the second latch to the fixed element. See FIGS. 29 and 30. The first latch 133 is supported for translational movement along a flat underside 149 of the door 123 by two pins 151 that project from the underside of the door into respective slots 153 in the first latch. The second latch 135 is supported for pivotal movement at the underside 149 of the door 123 by a pin 155 that projects from the underside of the door into a hole 157 in the second latch. A return spring 159 urges the second latch 135 to pivot until a pin 161 depending from the second latch is forced against a relatively short edge 163 of the first latch. See FIGS. 28 and 29. A return spring 165, which is significantly stronger than the return spring 159, urges the first latch 133 to locate its flat surface 141 beneath the first underside 143 of the fixed element 137 and to pivot the second latch 135 in opposition to its return spring to locate its flat surface 145 beneath the second underside 147 of the fixed element.

A door release button 167 is connected to the body 125 by a known pin-in-slot coupling, not shown, for sliding movement in opposition to a return spring 169. When the button 167 is manually moved in opposition to the return spring 169, it pushes against an edge section 171 of the first latch 133 which is beyond the flat surface 141 of the first latch. This causes the first latch 133 to move in opposition to the return spring 165 until its flat surface 141 is out from beneath the first underside 143 of the fixed element 137 to disengage the first latch from the fixed element. See FIGS. 31 and 32. Concurrently, the short edge 163 of the first latch 133 is retracted from the pin 161 of the second latch 135, allowing the return spring 159 to pivot the second latch until its flat surface 145 is out from beneath the second underside 147 of the fixed element 137 to disengage the second latch from the fixed element. Thus, the opening spring 139 will pop the door 123 open to uncover the loading chamber 131.

FIGS. 33 and 34 show the situation when the film cassette 1 is in the loading chamber 1 and the door 123 is being closed. As the door 123 is closed, an edge section 173 of the first latch 133 in line with the flat surface 141 of the first latch is forced down a relatively short incline 175 of the fixed element 137 to move the first latch in opposition to the return spring 165. Concurrently, the return spring 159 pivots the second latch 135 to make its pin 161 follow in contact with the short edge 163 of the first latch 133. The contact between the pin 161 and the short edge 163 holds an edge section 177 of the second latch 135 in line with the flat surface 145 of the second latch away from a relatively gradual incline 179 of the fixed element 137.

FIGS. 35 and 36 show the situation when the film cassette 1 is in the loading chamber 131 and the door 123 is almost closed. In this instance, the edge section 173 of the first latch 133 is held against an end 181 of the fixed element 137, adjacent the short incline 175, by the return spring 165. A key 183 depending from the second latch 135 in line with the pin 155 is received in a key slot 185 in the end 65 of the control shaft 55 of the film cassette 1. Since the control shaft 55 is rotationally oriented with its light valve 57 in the closed position, the return spring 159 cannot pivot the second latch 135. The pin 161 of the second latch 135, therefore, cannot follow in contact with the short edge 163 of the first latch 133 and the short edge thus separates from the pin. At the same time, the return spring 159 holds the edge section 177 of the second latch 135 away from an end 187 of the fixed element 137 adjacent the gradual incline 179.

FIGS. 37 and 38 show the situation when the door 123 is completely closed. Since the key 183 of the second latch 135 is received in the key slot 185 of the control shaft 55 prior to this time, the film cassette 1 is supported on a bottom spring, not shown, in the loading chamber 131 to allow the film cassette to be further depressed into the loading chamber as the door 123 is finally closed. When the door 123 is completely closed, the edge section 173 of the first latch 133 has moved beyond the end 181 of the fixed element 137 and the edge section 177 of the second latch 135 has moved beyond the end 185 of the fixed element. This allows the return spring 165 to move the first latch 133 until its flat surface 141 is moved beneath the first underside 143 of the fixed element 137 to engage the first latch to the fixed element. Concurrently, the short edge 163 of the first latch 133 pushes against the pin 161 of the second latch 135 to pivot the second latch in opposition to the return spring 159. As a result, the control shaft 55 will be moved from a rotational orientation with its light valve 57 in the closed position to one with its light valve in the opened position, and the flat surface 145 of the second latch 135 will be moved beneath the second underside 147 of the fixed element 137 to engage the second latch to the fixed element. Then, the filmstrip F can be advanced out of the film cassette 1.

FIGS. 39 and 40 show the situation when the filmstrip F is returned to the film cassette 1 and the button 167 is manually moved in opposition to the return spring 169. The button 167 pushes against the edge section 171 of the first latch 133 to move the first latch in opposition to the return spring 165 until its flat surface 141 is out from beneath the first underside 143 of the fixed element 137 to disengage the first latch from the fixed element. Concurrently, the short edge 163 of the first latch 133 is retracted from the pin 161 of the second latch 135, allowing the return spring 159 to pivot the second latch until the control shaft 55 is moved from a rotational orientation with its light valve 57 in the opened position to one with its light valve in the closed position, and the flat surface 145 of the second latch will be moved out from beneath the second underside 147 of the fixed element 137 to disengage the second latch from the fixed element. Thus, the opening spring 139 will pop the door 123 open to uncover the loading chamber 131.

Figure 41:
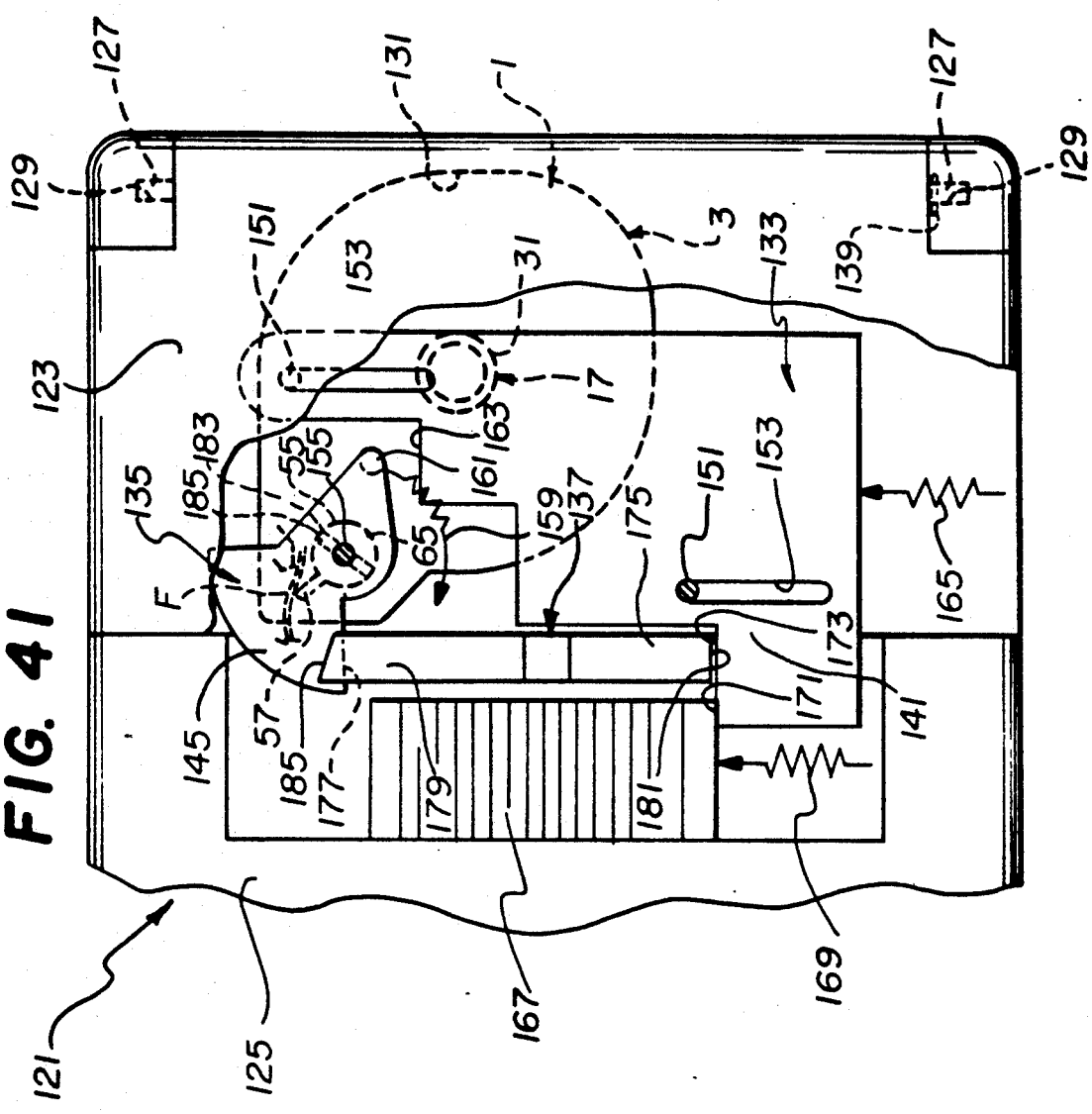
Figure 42:
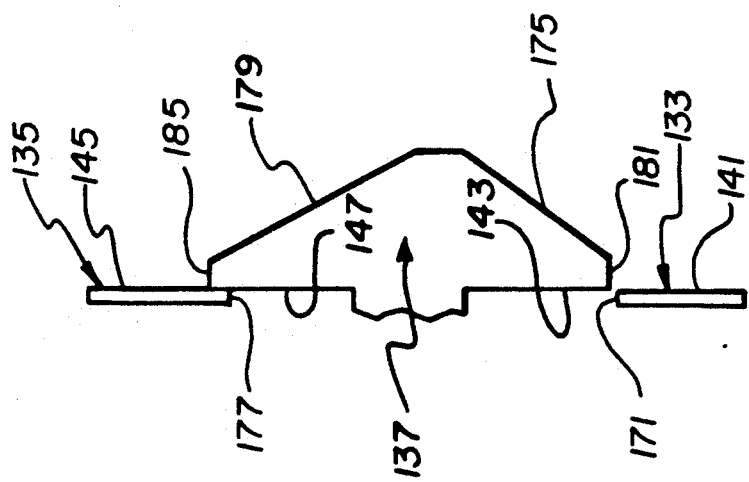

FIGS. 41 and 42 show the situation when the filmstrip F protrudes out of the film cassette 1 and the button 167 is manually moved in opposition to the return spring 169. The button 167 pushes against the edge section 171 of the first latch 133 to move the first latch in opposition to the return spring 165 until its flat surface 141 is out from beneath the first underside 143 of the fixed element 137 to disengage the first latch from the fixed element. Concurrently, the short edge 163 of the first latch 133 is retracted from the pin 161 of the second latch 135. However, the return spring 159 can only slightly pivot the second latch 135 because the control shaft 55 cannot be rotationally oriented with its light valve 57 in the closed position since the filmstrip F is protruding from the film cassette 1 to block the light valve. Consequently, the flat surface 145 of the second latch 135 cannot be moved out from beneath the second underside 147 of the fixed element 137, preventing the door 123 from being opened.

The invention has been described with reference to a preferred embodiment. However, it will be appreciated that variations and modifications can be effected within the ordinary skill in the art without departing from the scope of the invention.

I claim:

1. A camera to be used with a self-opening cassette containing a filmstrip and having a light shield for opening and closing the cassette, comprises a cover piece for opening and closing said camera, and is characterized by:

interlock mean connected to said cover piece and engageable with the light shield for preventing the cover piece from being opened when the light shield cannot be closed because a filmstrip is protruding out of the cassette.

2. A camera to be used with a self-opening cassette which contains a filmstrip and has a light shield movable to open and close the cassette, comprises a cover piece movable to open and close said camera and locking means movable in engagement with the light shield for moving the light shield to open and close the cassette and for locking said cover piece closed when the light shield is moved to open the cassette and unlocking the cover piece when the light shield is moved to close the cassette, and is characterized by:

restraining means for preventing said locking means from being moved in engagement with the light shield to move the light shield to close the cassette, so that the locking means will not unlock said cover piece, but which is manually movable for releasing the locking means to allow the locking means to be moved in engagement with the light shield to move the light shield to close the cassette, so that the locking means will unlock the cover piece; and spring means for moving said locking means in engagement with the light shield to move the light shield to close the cassette when said restraining means releases the locking means, so that the locking means will unlock said cover piece, but which, cannot move the locking means in engagement with the light shield to move the light shield to close the cassette when a filmstrip protruding out of the cassette blocks the light shield from closing the cassette, so that the locking means cannot unlock said cover piece.

3. A camera as recited in claim 2, further characterized by:

a manual push button supported for movement against said restraining means to move the restraining means to release said locking means.

4. A camera as recited in claim 2 or 3, wherein said restraining means includes integral means for securing said cover piece closed when the restraining means prevents said locking means from being moved to unlock the cover piece and unsecuring the cover piece when the restraining means releases the locking means.

5. A camera as recited in claim 2, wherein said locking means and said restraining means are supported on an underside of said cover piece.

* * * * *